US012627327B2

(12) United States Patent
Yuan et al.

(10) Patent No.: US 12,627,327 B2
(45) Date of Patent: May 12, 2026

(54) DIFFERENTIAL REPORT FOR MAXIMUM PERMISSIBLE EXPOSURE VALUES

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 18/551,582

(22) PCT Filed: Jun. 2, 2021

(86) PCT No.: PCT/CN2021/097838
§ 371 (c)(1),
(2) Date: Sep. 20, 2023

(87) PCT Pub. No.: WO2022/252141
PCT Pub. Date: Dec. 8, 2022

(65) Prior Publication Data
US 2024/0322851 A1 Sep. 26, 2024

(51) Int. Cl.
*H04B 1/3827* (2015.01)
*H04W 52/36* (2009.01)

(52) U.S. Cl.
CPC ........ *H04B 1/3838* (2013.01); *H04W 52/365* (2013.01)

(58) Field of Classification Search
CPC .... H04B 1/3838; H04B 7/0404; H04B 7/063; H04B 7/0691; H04B 7/06956;
(Continued)

(56) References Cited

U.S. PATENT DOCUMENTS

2022/0377678 A1* 11/2022 Rahman ............... H04B 1/3838
2023/0262615 A1* 8/2023 Li .......................... H04W 52/42
455/522

(Continued)

FOREIGN PATENT DOCUMENTS

CN 112106411 A 12/2020
WO WO-2021052716 A1 3/2021

OTHER PUBLICATIONS

CATT: "Enhancements on Multi-Beam Operation", 3GPP TSG RAN WG1 #105-e, R1-2104484, 3rd Generation Partnership Project, Mobile Competence Centre, 650, Route Des Lucioles, F-06921 Sophia-Antipolis Cedex, France, Vol. RAN WG1, No. e-Meeting, May 19, 2021-May 27, 2021, May 12, 2021, XP052010807, 12 pages, Sections 2.5.

(Continued)

*Primary Examiner* — Don N Vo
(74) *Attorney, Agent, or Firm* — Holland & Hart LLP

(57) ABSTRACT

Methods, systems, and devices for wireless communications are described. In some examples, a user equipment (UE) may receive control signaling that includes an indication that the UE is configured to report multiple values associated with maximum permissible exposure. Each of the multiple values may be of a same type but associated with different transmission aspects of the UE, the different transmission aspects including at least different transmission beams or different antenna panels. The UE may transmit a first maximum permissible exposure value associated with a first transmission aspect of the UE. The UE may transmit a second maximum permissible exposure value associated with a second transmission aspect of the UE and transmitted as a differential value based at least in part on the first maximum permissible exposure value.

30 Claims, 20 Drawing Sheets

(58) Field of Classification Search
CPC ..... H04W 52/365; H04W 52/42; H04W 8/24;
H04W 24/10
USPC ......................................................... 455/522
See application file for complete search history.

(56) References Cited

U.S. PATENT DOCUMENTS

| | | | | |
|---|---|---|---|---|
| 2023/0276376 A1* | 8/2023 | Bergström | ............ | H04W 24/10 |
| | | | | 455/522 |
| 2024/0063859 A1* | 2/2024 | Grieco | ................. | H04B 7/0486 |
| 2024/0195479 A1* | 6/2024 | Liu | ...................... | H04B 7/0691 |
| 2025/0081124 A1* | 3/2025 | Yao | ..................... | H04W 72/046 |

OTHER PUBLICATIONS

International Search Report and Written Opinion—PCT/CN2021/097838—ISA/EPO—Feb. 25, 2022.
Qualcomm Incorporated: "Enhancements on Multi-Beam Operation", 3GPP TSG RAN WG1 Meeting #105-e, R1-2104654, May 10-27, 2021, May 27, 2021 (May 27, 2021), 16 Pages, Sections 1, 6, section 7.
Supplementary European Search Report—EP21943510—Search Authority—Munich—Jan. 15, 2025.

* cited by examiner

Control Signaling 220

MPE Report 225

200

400

402

| Report Number | Fields |
|---|---|
| Report Part 1 | CRI or SSBRI #1 |
| | CRI or SSBRI #2 |
| | CRI or SSBRI #3 |
| | CRI or SSBRI #4 |
| | MPE #1 |
| | Differential MPE #2 |
| | Differential MPE #3 |
| | Differential MPE #4 |

| Report Number | Fields |
|---|---|
| Report Part 1 | Panel ID #1 |
| | Panel ID #2 |
| | Panel ID #3 |
| | Panel ID #4 |
| | MPE #1 |
| | Differential MPE #2 |
| | Differential MPE #3 |
| | Differential MPE #4 |

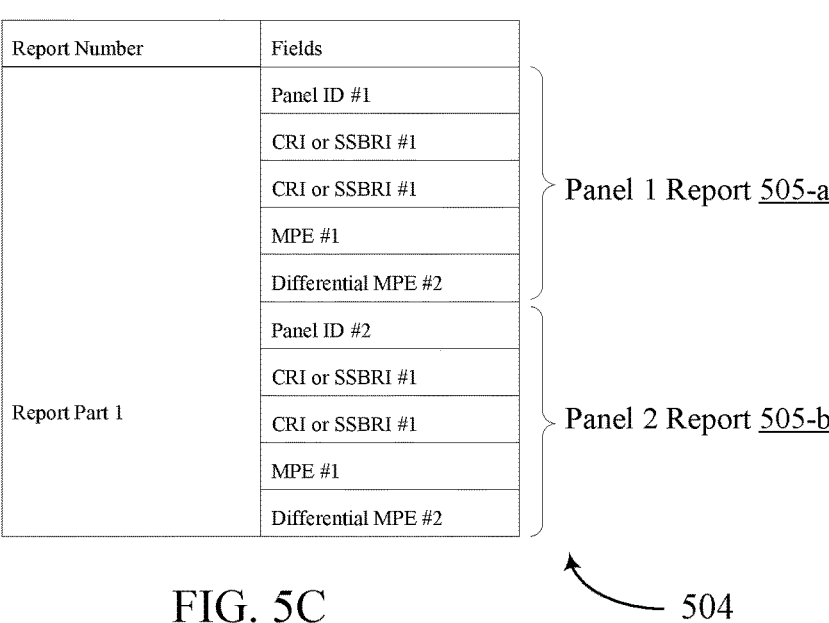

| Report Number | Fields | |
|---|---|---|
| Report Part 1 | Panel ID #1 | Panel 1 Report 505-a |
| | CRI or SSBRI #1 | |
| | CRI or SSBRI #1 | |
| | MPE #1 | |
| | Differential MPE #2 | |
| | Panel ID #2 | Panel 2 Report 505-b |
| | CRI or SSBRI #1 | |
| | CRI or SSBRI #1 | |
| | MPE #1 | |
| | Differential MPE #2 | |

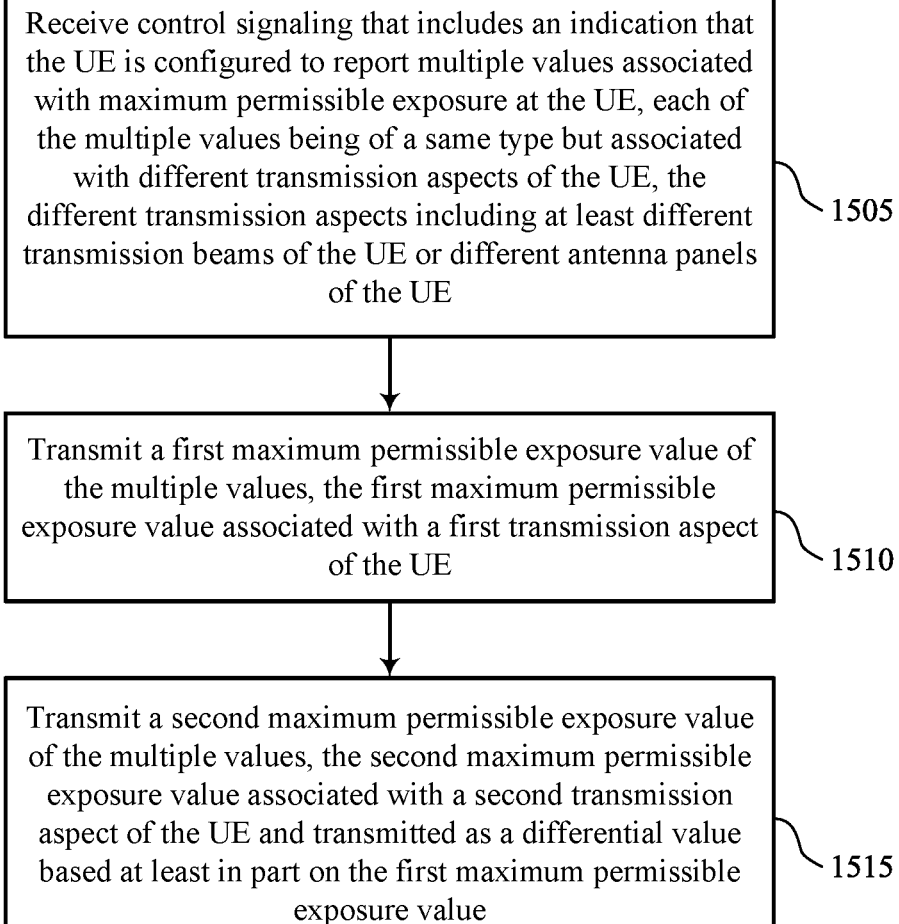

Receive control signaling that includes an indication that the UE is configured to report multiple values associated with maximum permissible exposure at the UE, each of the multiple values being of a same type but associated with different transmission aspects of the UE, the different transmission aspects including at least different transmission beams of the UE or different antenna panels of the UE

1505

Transmit a first maximum permissible exposure value of the multiple values, the first maximum permissible exposure value associated with a first transmission aspect of the UE

1510

Transmit a second maximum permissible exposure value of the multiple values, the second maximum permissible exposure value associated with a second transmission aspect of the UE and transmitted as a differential value based at least in part on the first maximum permissible exposure value

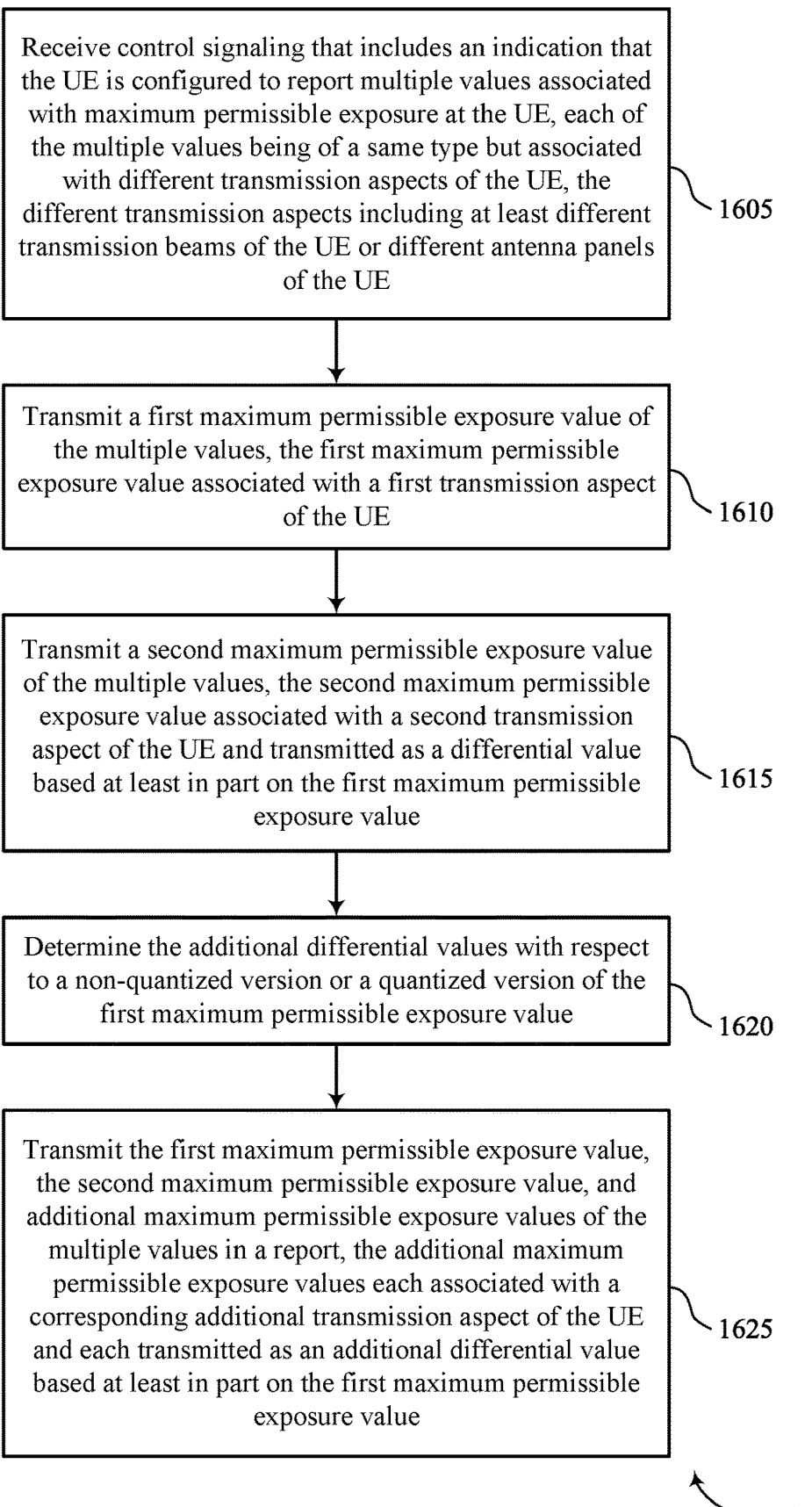

Receive control signaling that includes an indication that the UE is configured to report multiple values associated with maximum permissible exposure at the UE, each of the multiple values being of a same type but associated with different transmission aspects of the UE, the different transmission aspects including at least different transmission beams of the UE or different antenna panels of the UE

1605

Transmit a first maximum permissible exposure value of the multiple values, the first maximum permissible exposure value associated with a first transmission aspect of the UE

1610

Transmit a second maximum permissible exposure value of the multiple values, the second maximum permissible exposure value associated with a second transmission aspect of the UE and transmitted as a differential value based at least in part on the first maximum permissible exposure value

1615

Determine the additional differential values with respect to a non-quantized version or a quantized version of the first maximum permissible exposure value

1620

Transmit the first maximum permissible exposure value, the second maximum permissible exposure value, and additional maximum permissible exposure values of the multiple values in a report, the additional maximum permissible exposure values each associated with a corresponding additional transmission aspect of the UE and each transmitted as an additional differential value based at least in part on the first maximum permissible exposure value

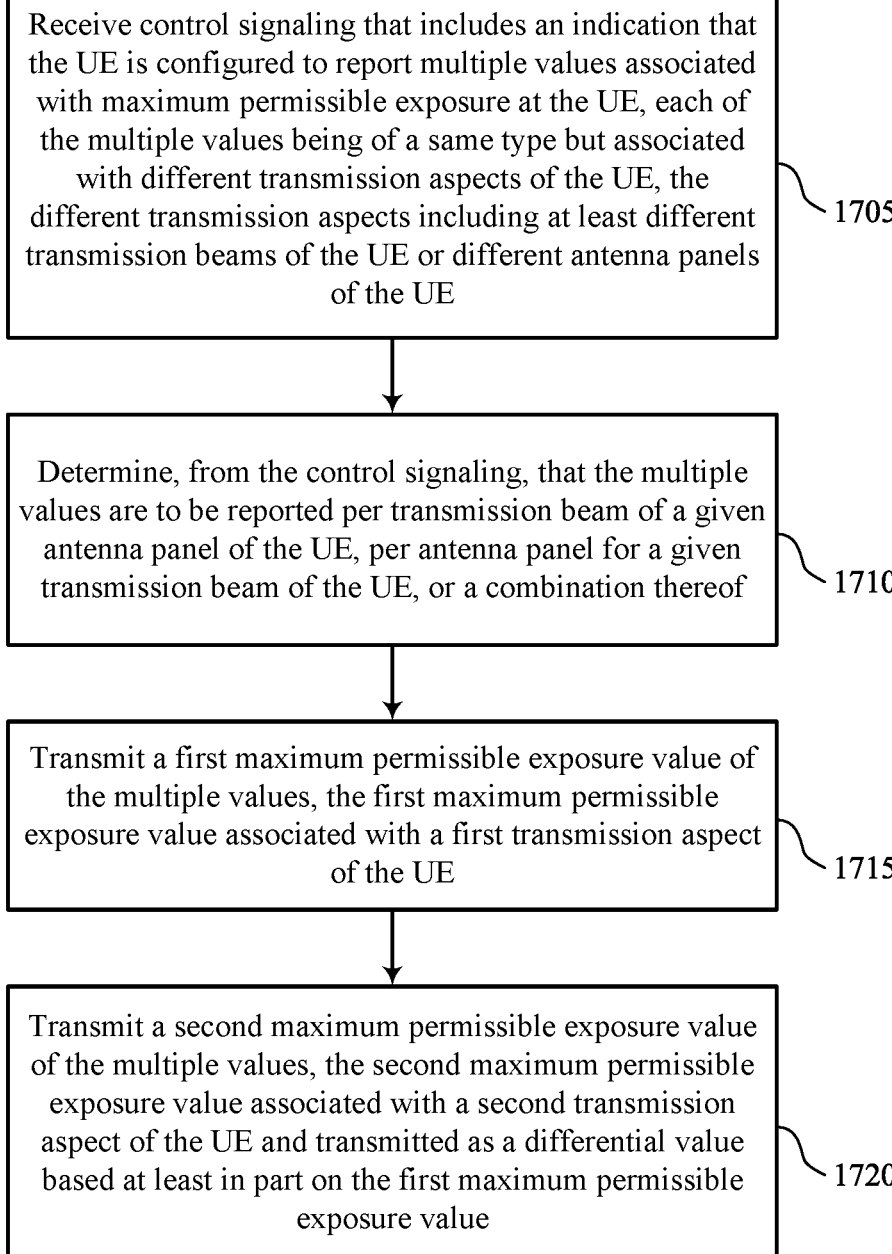

Receive control signaling that includes an indication that the UE is configured to report multiple values associated with maximum permissible exposure at the UE, each of the multiple values being of a same type but associated with different transmission aspects of the UE, the different transmission aspects including at least different transmission beams of the UE or different antenna panels of the UE

1705

Determine, from the control signaling, that the multiple values are to be reported per transmission beam of a given antenna panel of the UE, per antenna panel for a given transmission beam of the UE, or a combination thereof

1710

Transmit a first maximum permissible exposure value of the multiple values, the first maximum permissible exposure value associated with a first transmission aspect of the UE

1715

Transmit a second maximum permissible exposure value of the multiple values, the second maximum permissible exposure value associated with a second transmission aspect of the UE and transmitted as a differential value based at least in part on the first maximum permissible exposure value

Figure 18:
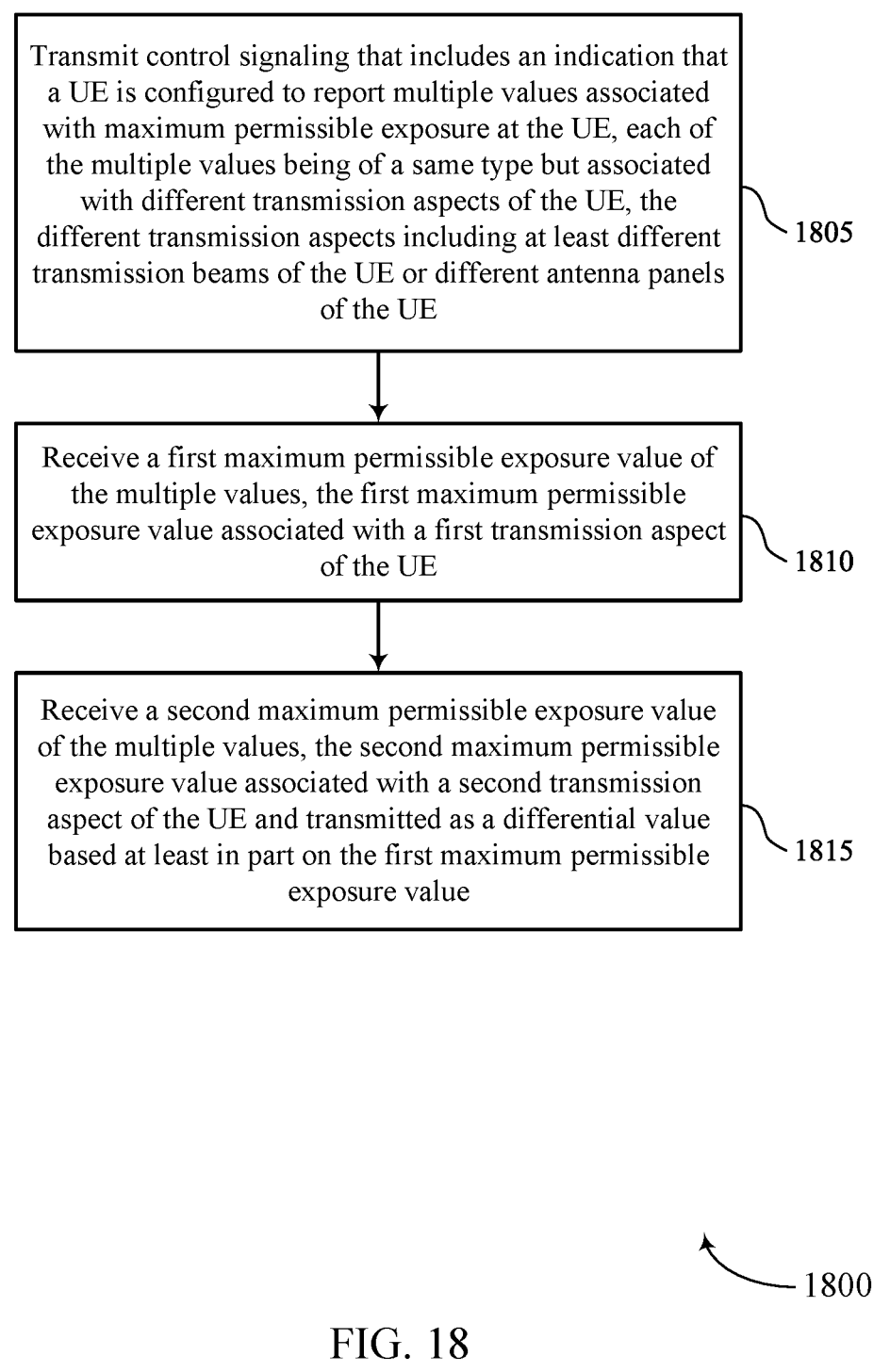

Transmit control signaling that includes an indication that a UE is configured to report multiple values associated with maximum permissible exposure at the UE, each of the multiple values being of a same type but associated with different transmission aspects of the UE, the different transmission aspects including at least different transmission beams of the UE or different antenna panels of the UE

⎱ 1805

↓

Receive a first maximum permissible exposure value of the multiple values, the first maximum permissible exposure value associated with a first transmission aspect of the UE

⎱ 1810

↓

Receive a second maximum permissible exposure value of the multiple values, the second maximum permissible exposure value associated with a second transmission aspect of the UE and transmitted as a differential value based at least in part on the first maximum permissible exposure value

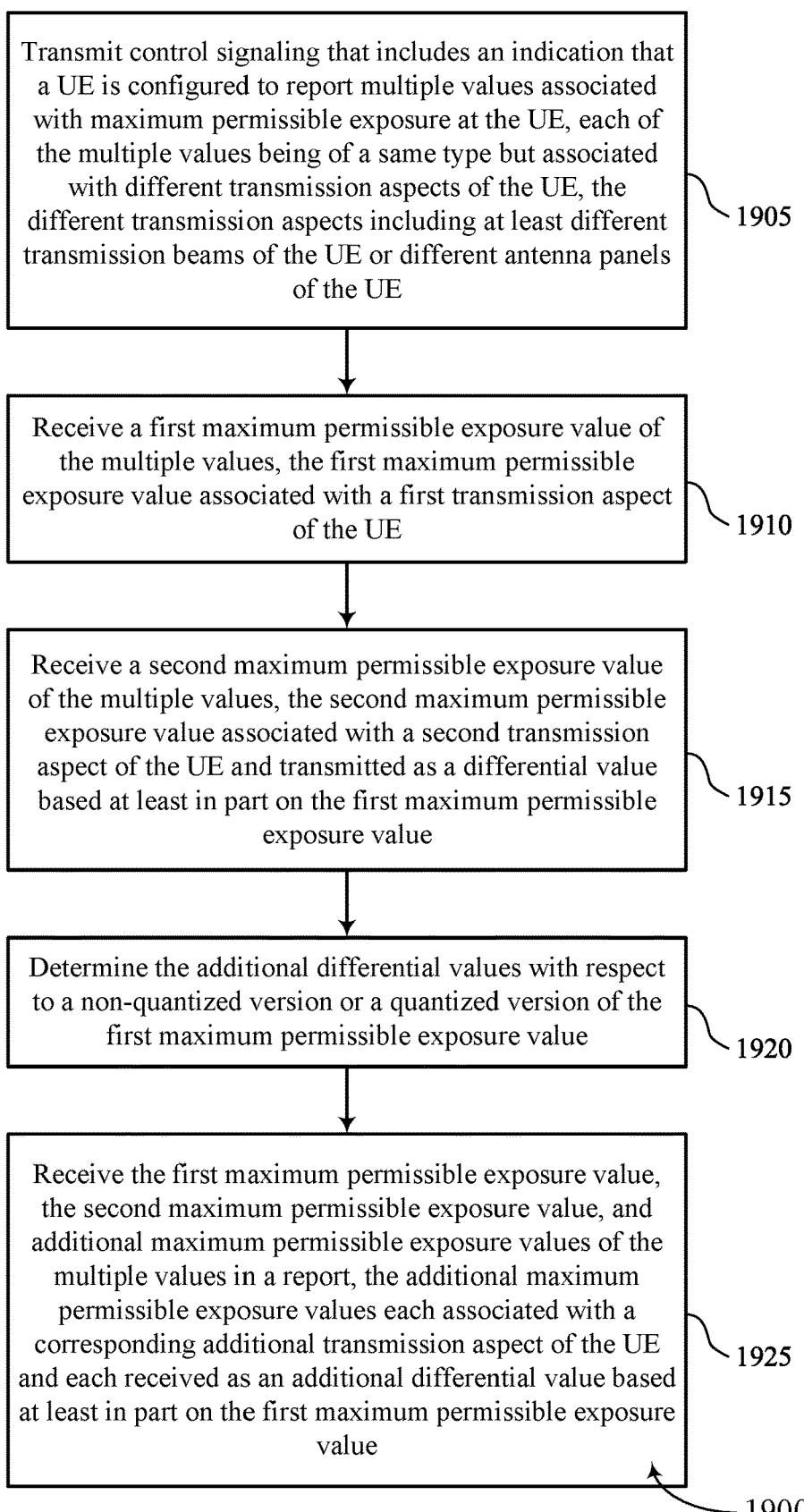

Transmit control signaling that includes an indication that a UE is configured to report multiple values associated with maximum permissible exposure at the UE, each of the multiple values being of a same type but associated with different transmission aspects of the UE, the different transmission aspects including at least different transmission beams of the UE or different antenna panels of the UE

1905

Receive a first maximum permissible exposure value of the multiple values, the first maximum permissible exposure value associated with a first transmission aspect of the UE

1910

Receive a second maximum permissible exposure value of the multiple values, the second maximum permissible exposure value associated with a second transmission aspect of the UE and transmitted as a differential value based at least in part on the first maximum permissible exposure value

1915

Determine the additional differential values with respect to a non-quantized version or a quantized version of the first maximum permissible exposure value

1920

Receive the first maximum permissible exposure value, the second maximum permissible exposure value, and additional maximum permissible exposure values of the multiple values in a report, the additional maximum permissible exposure values each associated with a corresponding additional transmission aspect of the UE and each received as an additional differential value based at least in part on the first maximum permissible exposure value

DIFFERENTIAL REPORT FOR MAXIMUM PERMISSIBLE EXPOSURE VALUES

CROSS REFERENCE

The present Application is a 371 national stage filing of International PCT Application No. PCT/CN2021/097838 by YUAN et al. entitled "DIFFERENTIAL REPORT FOR MAXIMUM PERMISSIBLE EXPOSURE VALUES," filed Jun. 2, 2021, which is assigned to the assignee hereof, and which is expressly incorporated by reference in its entirety herein.

FIELD OF TECHNOLOGY

The following relates to wireless communications, including differential reporting of maximum permissible exposure values.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications system, a wireless device may perform measurements related to radio frequency maximum permissible exposure. The wireless device may implement measurement and reporting of radio frequency maximum permissible exposure values. Conventional methods for such radio frequency maximum permissible exposure value reporting schemes may be improved.

SUMMARY

The described techniques relate to improved methods, systems, devices, and apparatuses that may support differential reporting of maximum permissible exposure values. Generally, the described techniques provide for methods for differential radio frequency maximum permissible exposure value reporting. A user equipment (UE) may receive control signaling that may include an indication that the UE may report multiple values associated with radio frequency maximum permissible exposure at the UE. The multiple values may be associated with different transmission aspects of the UE, and the different transmission aspects may include different combinations of transmission beams of the UE and antenna panels of the UE. The UE may transmit a first radio frequency maximum permissible exposure value of the multiple values, and the first radio frequency maximum permissible exposure value may be associated with a first transmission aspect of the UE. The UE may transmit a second radio frequency maximum permissible exposure value of the multiple values, and the second radio frequency maximum permissible exposure value may be associated with a second transmission aspect of the UE. The UE may transmit the second radio frequency maximum permissible exposure value as a differential value based on the first radio frequency maximum permissible exposure value.

A method for wireless communications at a user equipment (UE) is described. The method may include receiving control signaling that includes an indication that the UE is configured to report multiple values associated with maximum permissible exposure at the UE, each of the multiple values being of a same type but associated with different transmission aspects of the UE, the different transmission aspects including at least different transmission beams of the UE or different antenna panels of the UE, transmitting a first maximum permissible exposure value of the multiple values, the first maximum permissible exposure value associated with a first transmission aspect of the UE, and transmitting a second maximum permissible exposure value of the multiple values, the second maximum permissible exposure value associated with a second transmission aspect of the UE and transmitted as a differential value based on the first maximum permissible exposure value.

An apparatus for wireless communications at a UE is described. The apparatus may include a processor, memory coupled with the processor, and instructions stored in the memory. The instructions may be executable by the processor to cause the apparatus to receive control signaling that includes an indication that the UE is configured to report multiple values associated with maximum permissible exposure at the UE, each of the multiple values being of a same type but associated with different transmission aspects of the UE, the different transmission aspects including at least different transmission beams of the UE or different antenna panels of the UE, transmit a first maximum permissible exposure value of the multiple values, the first maximum permissible exposure value associated with a first transmission aspect of the UE, and transmit a second maximum permissible exposure value of the multiple values, the second maximum permissible exposure value associated with a second transmission aspect of the UE and transmitted as a differential value based on the first maximum permissible exposure value.

Another apparatus for wireless communications at a UE is described. The apparatus may include means for receiving control signaling that includes an indication that the UE is configured to report multiple values associated with maximum permissible exposure at the UE, each of the multiple values being of a same type but associated with different transmission aspects of the UE, the different transmission aspects including at least different transmission beams of the UE or different antenna panels of the UE, means for transmitting a first maximum permissible exposure value of the multiple values, the first maximum permissible exposure value associated with a first transmission aspect of the UE, and means for transmitting a second maximum permissible exposure value of the multiple values, the second maximum permissible exposure value associated with a second transmission aspect of the UE and transmitted as a differential value based on the first maximum permissible exposure value.

A non-transitory computer-readable medium storing code for wireless communications at a UE is described. The code may include instructions executable by a processor to receive control signaling that includes an indication that the UE is configured to report multiple values associated with maximum permissible exposure at the UE, each of the multiple values being of a same type but associated with different transmission aspects of the UE, the different transmission aspects including at least different transmission beams of the UE or different antenna panels of the UE, transmit a first maximum permissible exposure value of the multiple values, the first maximum permissible exposure value associated with a first transmission aspect of the UE, and transmit a second maximum permissible exposure value of the multiple values, the second maximum permissible exposure value associated with a second transmission aspect of the UE and transmitted as a differential value based on the first maximum permissible exposure value.

Some examples of the method, apparatuses, and non-transitory computer-readable medium described herein may further include operations, features, means, or instructions for transmitting the first maximum permissible exposure value, the second maximum permissible exposure value, and additional maximum permissible exposure values of the multiple values in a report, the additional maximum permissible exposure values each associated with a corresponding additional transmission aspect of the UE and each transmitted as an additional differential value based on an immediately preceding differential value within the report.

Some examples of the method, apparatuses, and non-transitory computer-readable medium described herein may further include operations, features, means, or instructions for transmitting the first maximum permissible exposure value, the second maximum permissible exposure value, and additional maximum permissible exposure values of the multiple values in a report, the additional maximum permissible exposure values each associated with a corresponding additional transmission aspect of the UE and each transmitted as an additional differential value based on the first maximum permissible exposure value.

Some examples of the method, apparatuses, and non-transitory computer-readable medium described herein may further include operations, features, means, or instructions for determining the additional differential values with respect to a non-quantized version or a quantized version of the first maximum permissible exposure value.

Some examples of the method, apparatuses, and non-transitory computer-readable medium described herein may further include operations, features, means, or instructions for determining, from the control signaling, a differential maximum permissible exposure reporting scheme that may be used by the UE for transmitting the multiple values using respective differential values.

Some examples of the method, apparatuses, and non-transitory computer-readable medium described herein may further include operations, features, means, or instructions for determining, from the control signaling, that the multiple values may be reported per transmission beam of a given antenna panel of the UE, per antenna panel for a given transmission beam of the UE, or a combination thereof.

In some examples of the method, apparatuses, and non-transitory computer-readable medium described herein, the first transmission aspect may be a first antenna panel of the UE and the second transmission aspect may be a second antenna panel of the UE.

In some examples of the method, apparatuses, and non-transitory computer-readable medium described herein, the first transmission aspect may be a first transmission beam of the UE and the second transmission aspect may be a second transmission beam of the UE.

In some examples of the method, apparatuses, and non-transitory computer-readable medium described herein, the second maximum permissible exposure value includes fewer bits than the first maximum permissible exposure value.

Some examples of the method, apparatuses, and non-transitory computer-readable medium described herein may further include operations, features, means, or instructions for transmitting the first maximum permissible exposure value and the second maximum permissible exposure value as respective power headroom report values.

In some examples of the method, apparatuses, and non-transitory computer-readable medium described herein, the respective power headroom report values may be each associated with an activated uplink transmission configuration indicator (TCI) state or a joint TCI state.

In some examples of the method, apparatuses, and non-transitory computer-readable medium described herein, the respective power headroom report values may be each associated with at least one of a reported synchronization signal/physical broadcast channel block resource indicator (SSBRI), a channel state information (CSI) reference signal resource indicator (CRI), or a panel indication.

Some examples of the method, apparatuses, and non-transitory computer-readable medium described herein may further include operations, features, means, or instructions for transmitting the first maximum permissible exposure value and the second maximum permissible exposure value as respective reference signal received power report values or respective signal to interference and noise ratio report values.

In some examples of the method, apparatuses, and non-transitory computer-readable medium described herein, each of the respective reference signal received power report values or respective signal to interference and noise ratio report values may be associated with at least one of a reported SSBRI, a CRI, or a panel indication.

A method for wireless communications at a base station is described. The method may include transmitting control signaling that includes an indication that a UE is configured to report multiple values associated with maximum permissible exposure at the UE, each of the multiple values being of a same type but associated with different transmission aspects of the UE, the different transmission aspects including at least different transmission beams of the UE or different antenna panels of the UE, receiving a first maximum permissible exposure value of the multiple values, the first maximum permissible exposure value associated with a first transmission aspect of the UE, and receiving a second maximum permissible exposure value of the multiple values, the second maximum permissible exposure value associated with a second transmission aspect of the UE and transmitted as a differential value based on the first maximum permissible exposure value.

An apparatus for wireless communications at a base station is described. The apparatus may include a processor, memory coupled with the processor, and instructions stored in the memory. The instructions may be executable by the processor to cause the apparatus to transmit control signaling that includes an indication that a UE is configured to report multiple values associated with maximum permissible exposure at the UE, each of the multiple values being of a same type but associated with different transmission aspects of the UE, the different transmission aspects including at least different transmission beams of the UE or different antenna panels of the UE, receive a first maximum permissible exposure value of the multiple values, the first maximum permissible exposure value associated with a first transmission aspect of the UE, and receive a second maximum permissible exposure value of the multiple values, the second maximum permissible exposure value associated with a second transmission aspect of the UE and transmitted as a differential value based on the first maximum permissible exposure value.

Another apparatus for wireless communications at a base station is described. The apparatus may include means for transmitting control signaling that includes an indication that a UE is configured to report multiple values associated with maximum permissible exposure at the UE, each of the multiple values being of a same type but associated with different transmission aspects of the UE, the different transmission aspects including at least different transmission beams of the UE or different antenna panels of the UE, means for receiving a first maximum permissible exposure value of the multiple values, the first maximum permissible exposure value associated with a first transmission aspect of the UE, and means for receiving a second maximum permissible exposure value of the multiple values, the second maximum permissible exposure value associated with a second transmission aspect of the UE and transmitted as a differential value based on the first maximum permissible exposure value.

A non-transitory computer-readable medium storing code for wireless communications at a base station is described. The code may include instructions executable by a processor to transmit control signaling that includes an indication that a UE is configured to report multiple values associated with maximum permissible exposure at the UE, each of the multiple values being of a same type but associated with different transmission aspects of the UE, the different transmission aspects including at least different transmission beams of the UE or different antenna panels of the UE, receive a first maximum permissible exposure value of the multiple values, the first maximum permissible exposure value associated with a first transmission aspect of the UE, and receive a second maximum permissible exposure value of the multiple values, the second maximum permissible exposure value associated with a second transmission aspect of the UE and transmitted as a differential value based on the first maximum permissible exposure value.

Some examples of the method, apparatuses, and non-transitory computer-readable medium described herein may further include operations, features, means, or instructions for receiving the first maximum permissible exposure value, the second maximum permissible exposure value, and additional maximum permissible exposure values of the multiple values in a report, the additional maximum permissible exposure values each associated with a corresponding additional transmission aspect of the UE and each received as an additional differential value based on an immediately preceding differential value within the report.

Some examples of the method, apparatuses, and non-transitory computer-readable medium described herein may further include operations, features, means, or instructions for receiving the first maximum permissible exposure value, the second maximum permissible exposure value, and additional maximum permissible exposure values of the multiple values in a report, the additional maximum permissible exposure values each associated with a corresponding additional transmission aspect of the UE and each received as an additional differential value based on the first maximum permissible exposure value.

Some examples of the method, apparatuses, and non-transitory computer-readable medium described herein may further include operations, features, means, or instructions for determining the additional differential values with respect to a non-quantized version or a quantized version of the first maximum permissible exposure value.

Some examples of the method, apparatuses, and non-transitory computer-readable medium described herein may further include operations, features, means, or instructions for determining a differential maximum permissible exposure reporting scheme that may be used by the UE for transmitting the multiple values using respective differential values.

Some examples of the method, apparatuses, and non-transitory computer-readable medium described herein may further include operations, features, means, or instructions for determining that the multiple values may be reported per transmission beam of a given antenna panel of the UE, per antenna panel for a given transmission beam of the UE, or a combination thereof.

In some examples of the method, apparatuses, and non-transitory computer-readable medium described herein, the first transmission aspect may be a first antenna panel of the UE and the second transmission aspect may be a second antenna panel of the UE.

In some examples of the method, apparatuses, and non-transitory computer-readable medium described herein, the first transmission aspect may be a first transmission beam of the UE and the second transmission aspect may be a second transmission beam of the UE.

In some examples of the method, apparatuses, and non-transitory computer-readable medium described herein, the second maximum permissible exposure value includes fewer bits than the first maximum permissible exposure value.

Some examples of the method, apparatuses, and non-transitory computer-readable medium described herein may further include operations, features, means, or instructions for receiving the first maximum permissible exposure value and the second maximum permissible exposure value as respective power headroom report values.

In some examples of the method, apparatuses, and non-transitory computer-readable medium described herein, the respective power headroom report values may be each associated with an activated uplink TCI state or a joint TCI state.

In some examples of the method, apparatuses, and non-transitory computer-readable medium described herein, the respective power headroom report values may be each associated with at least one of a reported SSBRI, a CRI, or a panel indication.

Some examples of the method, apparatuses, and non-transitory computer-readable medium described herein may further include operations, features, means, or instructions for receiving the first maximum permissible exposure value and the second maximum permissible exposure value as respective reference signal received power report values or respective signal to interference and noise ratio report values.

In some examples of the method, apparatuses, and non-transitory computer-readable medium described herein, each of the respective reference signal received power report values or respective signal to interference and noise ratio report values may be associated with at least one of a reported SSBRI, a channel state information CRI, or a panel indication.

BRIEF DESCRIPTION OF THE DRAWINGS

FIGS. 5A, 5B, and 5C illustrate examples of MPE reporting schemes.

FIGS. 15 through 20 show flowcharts illustrating methods.

DETAILED DESCRIPTION

Wireless devices may communicate via radio frequency transmissions, and these transmissions may emit radio frequency emissions. The strength of these emissions is may be limited in the form of radio frequency exposure values or maximum permissible exposure (MPE) values or limits. In some examples of wireless communications systems, such emissions may be measured or reported (e.g., in the form of MPE-related measurements and reports) and adjustments may be made to one or more transmission parameters based on the measurements and reporting. In some cases, multiple MPE-related values to be included within a single MPE measurement report. However, reporting multiple MPE values per report may result in a significant increase in uplink control information payloads.

To reduce the potential significant increase in payloads, a differential reporting scheme may be used for MPE-related value reporting. A first MPE value may be reported. Second and additional MPE values may also be included in the report, but may be reported as differential values, either with respect to the first MPE value or with respect to other MPE values in the report. The differential reporting may be organized within the report on a per beam basis of a given antenna panel, on a per panel basis for given beams, or as a combination of per beam and per panel reporting. In some examples, the MPE values reported may be power headroom report values, reference signal received power (RSRP) values, or other values.

Aspects of the disclosure are initially described in the context of wireless communications systems. Aspects of the disclosure are then illustrated by a system diagram, exemplary MPE reporting schemes, and a process flow. Aspects of the disclosure are further illustrated by and described with reference to apparatus diagrams, system diagrams, and flowcharts that relate to differential report for maximum permissible exposure values.

Figure 1:
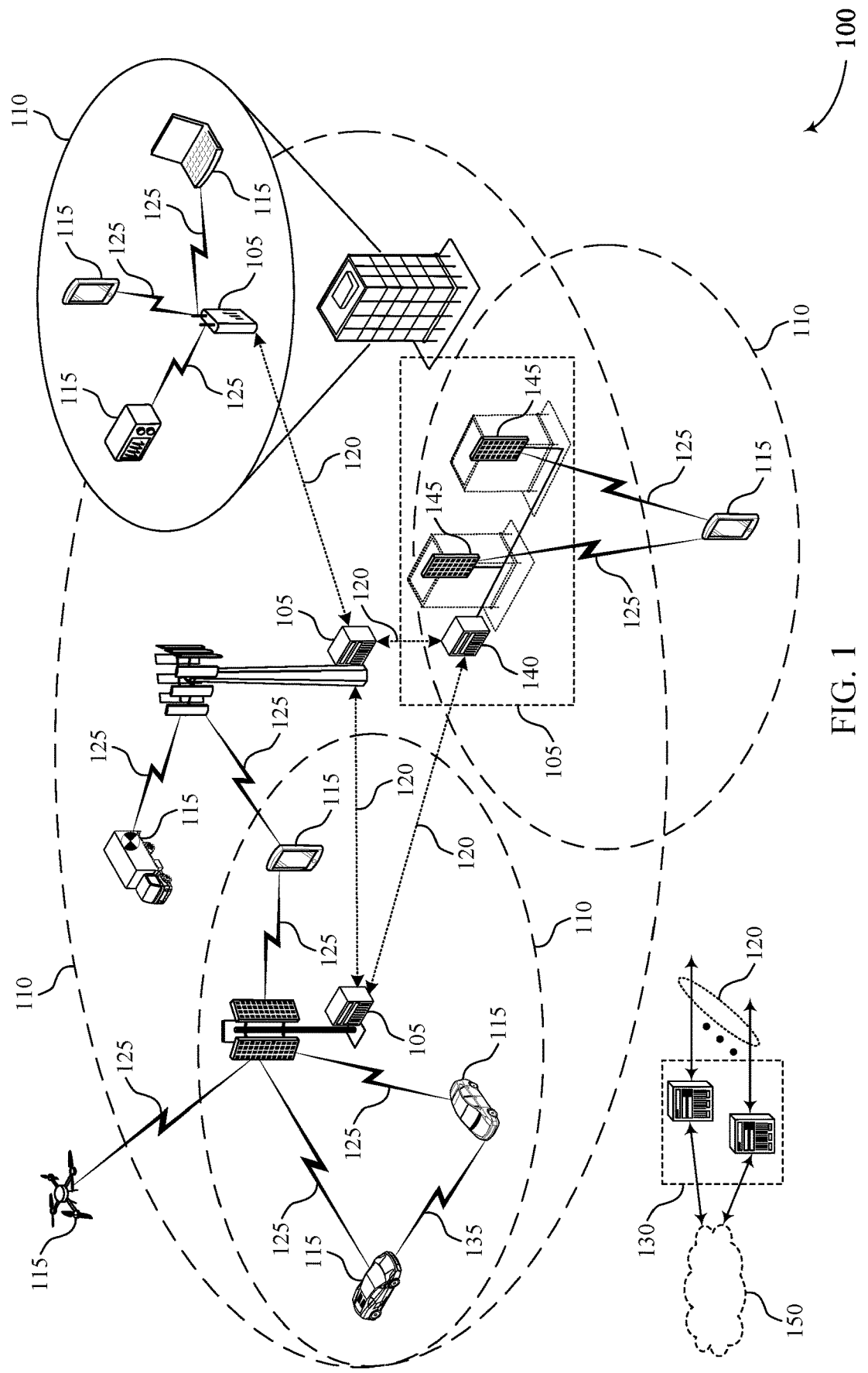
FIG. 1 illustrates an example of a wireless communications system.

FIG. 1 illustrates an example of a wireless communications system. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, the wireless devices may implement one or more techniques for radio frequency exposure values or MPE values and reporting of such values. For example, a UE 115 may receive control signaling from the base station 105. The control signaling may indicate that the UE may report one or more MPE values. The one or more MPE values may be associated with different transmission aspects of the UE 115 (e.g., an antenna panel of the UE, a transmission beam of the UE, another transmission aspect, or a combination thereof). The UE 115 may transmit a first MPE value of the one or more MPE values, and the first MPE value may be associated with a first transmission aspect of the UE. The UE 115 may transmit a second MPE value of the one or more MPE values. The second MPE value may be associated with a second transmission aspect of the UE 115. The second MPE value may be a differential value that may be based on the first MPE value. For example, the first MPE value may be an MPE value expressed with a first numerical value. However, the second MPE value may be a differential value that expresses a difference between the first numerical value and a second numerical value. In this way, payloads, overhead, bandwidth, or other resources may be lessened while still communicating the MPE values, since the second MPE value may utilize less payload, overhead, bandwidth, or other resources.

Figure 2:
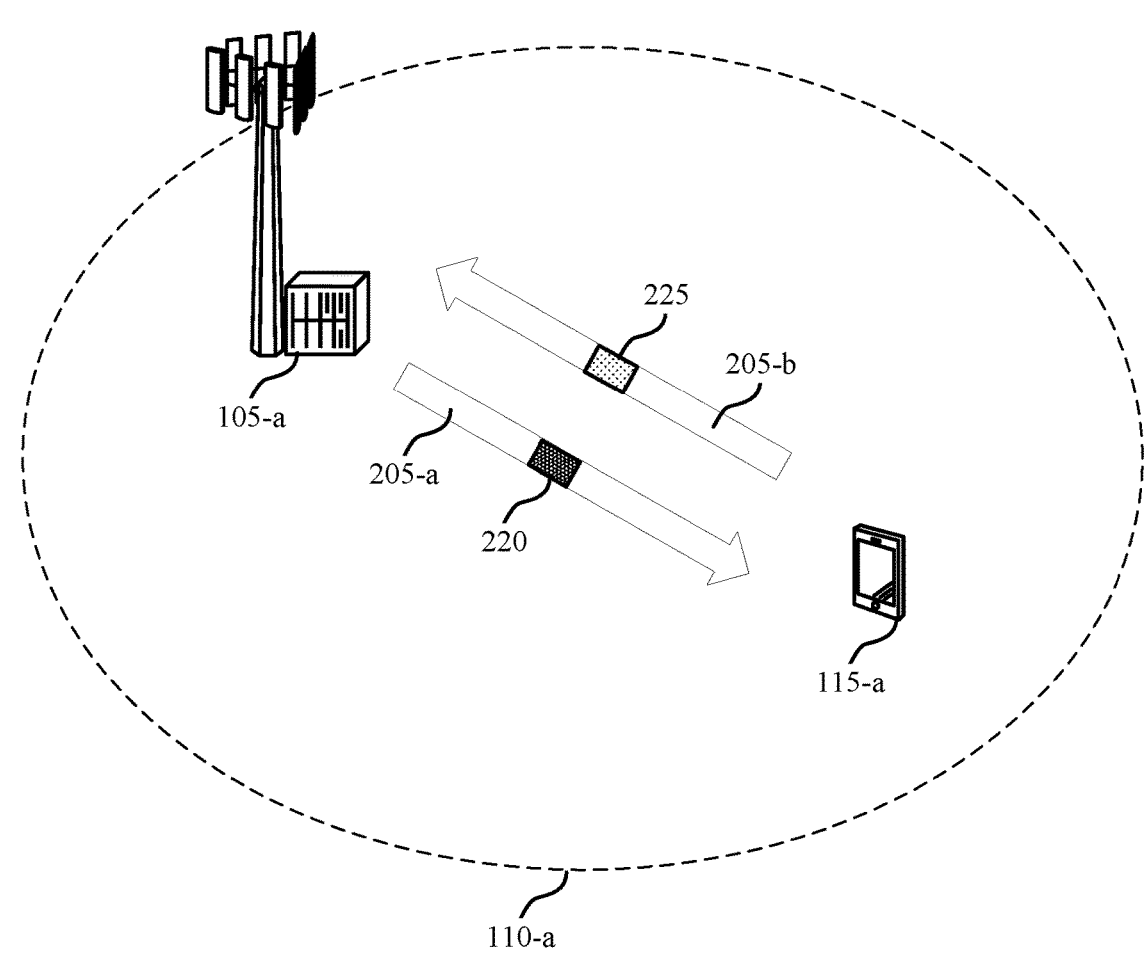
FIG. 2 illustrates an example of a system diagram.

FIG. 2 illustrates an example of a system diagram 200. The wireless communications system 200 may include a base station 105-a that may be an example of the base station 105 discussed in relation to FIG. 1. The wireless communications system 200 may include UE 115-a that may be an example of the UE 115 discussed in relation to FIG. 1. In some examples, the base station 105-a and the UE 115a may be located in a geographic coverage area 110-a. The base station 105-a may communicate with the UE 115-a via one or more downlink communication links 205-a and one or more uplink communication links 205-b.

In some examples, the UE 115-a may receive control signaling 220 from the base station 105-a. For example, the control signaling 220 may be RRC signaling, downlink control information (DCI) signaling, or other signaling. For example, the DCI signaling may have a channel state information (CSI) request field to trigger a CSI report from the UE 115-a. In response to the control signaling 220, the UE 115-a may transmit a CSI report which includes multiple beam indices and multiple beam metrics corresponding to the beam indices. A beam index may be a CSI resource indicator (CRI), or a synchronization signal/physical broadcast channel block resource indicator (SSBRI). A beam metric may be for determining a downlink channel quality such as an L1-RSRP or an L1-SINR value, or for determining an uplink channel quality such as an MPE value. In a first example, the MPE value may be an offsetting L1-RSRP calculated with regard to the MPE effect associated with the beam index. In a second example, the MPE value may be a power headroom reporting (PHR) value or a modified value based on a PHR value, where the PHR value may be based on a virtual uplink transmission using reference transmission parameters or a real uplink transmission using indicated transmission parameters associated with the beam index. The MPE value may be beam specific or panel specific. In a third example, the MPE value may be an uplink L1-RSRP or a modified value based on an uplink L1-RSRP value, where the uplink L1-RSRP may be the difference between a maximum configured transmit power of the UE 115-a and an estimated downlink channel path-loss associated with the beam index. In a fourth example, the MPE value may be a power reduction value such as power back-off due to power management (e.g., Power-management power reduction (P-MPR) value) associated with the beam index.

In some aspects, for each reported beam index in the CSI report, the UE 115-a may determine whether an MPE value is to be reported associated with the beam index or not. For example, the UE 115-a may determine whether a virtual PHR value (or a modified value of PHR) is reported along with the SSBRI or CRI not. Correspondingly, the UE 115-a may indicate the existence of the MPE value in the CSI report. In some other aspects, for each reported beam index in the CSI report, the UE 115-a may determine the type of an MPE value to be reported associated with the beam index. For example, the UE 115-a may determine whether a virtual PHR value or a modified value of PHR is to be reported along with the SSBRI or CRI. Correspondingly, the UE 115-a may indicate the type information of the MPE value in the CSI report. In some aspects, the UE 115-a may report a UE capability for the supported types of MPE value to the base station 105-a.

In some aspects, for the same CSI report in a single CSI reporting instance, the UE 115-a may report at least one beam index to indicate the base station 105-a the preferred beam for uplink transmission. Additionally, in the CSI report, the UE 115-a may report an MPE value that accounts for the MPE effect associated with the beam index. For example, the beam index may be a CRI or a SSBRI, and the MPE value may be an offsetting L1-RSRP value calculated with regard to the MPE effect associated with the beam index. The offsetting L1-RSRP value may be determined at least based on a P-MPR value associated with the beam index.

In some aspects, for the same CSI report in a single CSI reporting instance, the UE 115-a may report at least one beam index to indicate the base station 105-a the preferred beam for downlink reception only, or for both uplink transmission and downlink reception. Additionally, in the CSI report, the UE 115-a may report a first value and a second value associated with the beam index. For example, the first value may be an L1-RSRP value associated with the beam index, and the second value may be an MPE value associated with the beam index. For another example, the MPE value may be a PHR value or a modified value of PHR where the PHR value may be based on a virtual uplink transmission using reference transmission parameters or a real uplink transmission using indicated transmission parameters, and the beam index may be a CRI or a SSBRI.

In some aspects, for the same CSI report in a single CSI reporting instance, the UE 115-a may report at least one first beam index to indicate the base station 105-a the preferred beam for uplink transmission, and at least one second beam index to indicate the base station 105-a the preferred beam for downlink reception. Additionally, in the CSI report, the UE 115-a may report a first value associated with the first beam index and a second value associated with the second beam index. For example, the first value may be an L1-RSRP, and the second value may be an MPE value. For another example, the MPE value may be a PHR value or a modified value of PHR, where the PHR value may be based on a virtual uplink transmission using reference transmission parameters or real uplink transmission using indicated transmission parameters, and may be beam or panel specific. The beam index may be a CRI or a SSBRI.

The control signaling 220 may include an indication that the UE 115-a is to report one or more MPE values. The MPE values may indicate a level of radio frequency exposure at a particular place or time, and may represent a limit or threshold that a device (e.g., the UE 115-a) may not exceed for various reasons (e.g., user safety). The MPE values to be reported by the UE 115-a may be of a same type. Additionally, or alternatively, one or more of the MPE values may be associated, individually or collectively, with different transmissions aspects of the UE 115-a. In some examples, the different transmission aspects may include different transmission beams of the UE 115-a or different antenna panels of the UE 115-a.

In some examples, an MPE value may include various types of information associated with MPE. An MPE value may be beam specific which is associated with one or more activated transmission configuration indicators (TCIs), where the TCI may provide spatial transmit filter information to uplink transmissions such as PUCCH, physical uplink shared channel (PUSCH) or sounding reference signal (SRS). An MPE value may be panel specific and common to multiple beams associated with the panel, where the panel may be identified by any ID of a control resource set (CORESET), a SRS resource set, a group of TCIs, a close loop index in power control parameters, an explicit bit in the DCI field, an explicit panel ID, and etc. In some examples, an MPE value may include a power headroom report. The power headroom report may be a virtual power headroom report. In some examples, the power headroom report may be a modified power headroom report. A power headroom report may be associated with one or more activated uplink TCIs. Additionally, or alternatively, a modified power headroom report may include one or more joint TCIs. Further, a power headroom report may be associated with one or more reported signal/physical broadcast channel block resource indicators (SSBRIs), one or more channel state information reference signal resource indicators (CRIs), one or more panel indications, another measurement or indication, or a combination thereof. The modified power headroom report may be associated with each activated uplink TCI or joint TCI, or associated with each of the reported SSBRI(s)/ CRI(s) and/or panel ID.

In some examples, an MPE value may include an RSRP measurement (e.g., an L1-RSRP), a signal to interference and noise ratio (SINR) measurement (e.g., L1-SINR). Alternatively, or additionally, an MPE value may include a modified version of an RSRP measurement or an SINR measurement that may account for an MPE effect that may be associated with one or more of an SSBRI, a CRI, a panel indication, another measurement or indication, or a combination thereof.

In some examples, a UE 115-*a* may perform MPE measurements to determine, select, or obtain one or more MPE values. The UE 115-*a* may report one or more MPE values (e.g., to the base station 105-*a*). For example, the UE 115-*a* may transmit a first MPE value to the base station 105-*a* (e.g., in MPE report 225), and the first MPE value may be associated with a first transmission aspect of the UE 115-*a* (e.g., a transmission beam or an antenna panel). In some examples, the UE 115-*a* may send one or more additional MPE values (e.g., to the base station 105-*a*). The one or more additional MPE values may be associated with one or more additional transmission aspects of the UE 115-*a* (e.g., one or more transmission beams, antenna panels, other aspects, or a combination thereof). The one or more additional MPE values may also be transmitted as a differential value. For example, an MPE value may be a differential value that describes a measurement or actual value (e.g., an MPE measurement or value) in terms of the difference between the measurement or value and a reference value. A differential value may be expressed in a variety of methods, including expressing a difference between the values, or expressing the second value as a multiple of the reference value. For example, if a first MPE value to be used as a reference value has a value of 1 mW/cm², a second MPE value transmitted as a differential value may indicate, for example, 0.5 to indicate that the second MPE value is 0.5 units higher than the reference value (e.g., 1.5 mW/cm²), or −0.25 to indicate that the second MPE value is 0.25 units lower than the reference value (e.g., 0.75 mW/cm²). Alternatively, or additionally, a differential value could be reported as a multiple of the reference value (e.g., a differential value of 2 may indicate that the value associated with the differential value is two times the value of the reference value). Various different differential reporting schemes may be employed using various reference values, and some examples of such reporting schemes are discussed in further detail herein.

In some examples, a first MPE value (e.g., an MPE value that may serve as a reference value for differential reporting of one or more additional MPE values). may be reported with a number of bits. For example, a first MPE value may be reported with a relatively large number of bits (e.g., 7 bits). One or more additional MPE values, however, may be reported using a different number of bits (e.g., a smaller number of bits than the number of bits used for the reference value). For example, a second and third MPE value may be reported with a smaller number of bits (e.g., 4 bits) used for differential values. Various combinations of such reports and bit numbers may be used.

In some examples, an MPE value used as a reference value for differential reporting of one or more additional MPE values may be a quantized value or a non-quantized value. For example, in some reporting schemes, an MPE value may be quantized before transmission for various reasons (e.g., to reduce transmission overhead). In some examples, a differential value may be reported relative to the quantized value. In some examples, a differential value may be reported relative to a non-quantized value. In either case, a quantized value or a quantized value may be used as a reference value, as a reported value, or both.

Figure 3A:
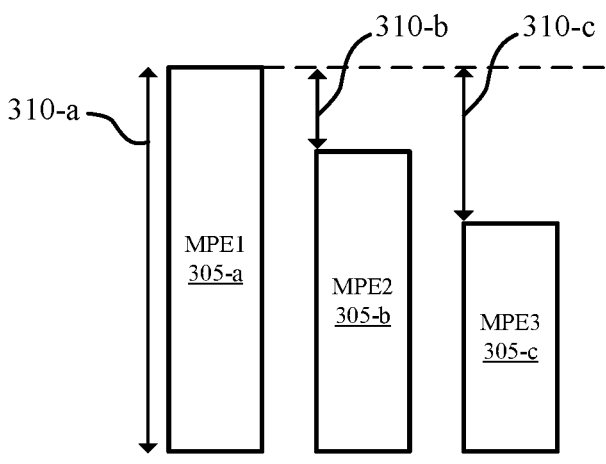
FIGS. 3A and 3B illustrate examples of MPE reporting schemes.
Figure 3B:
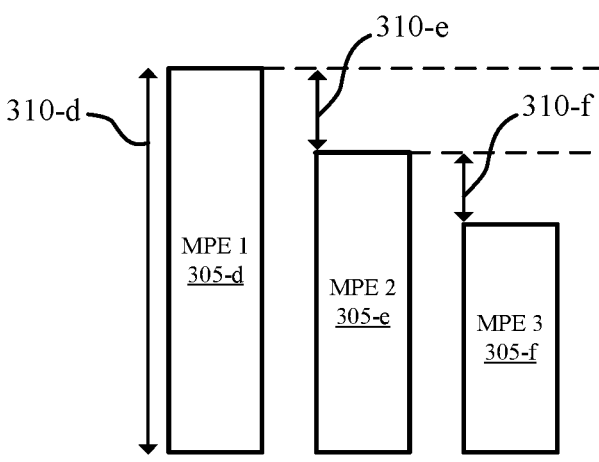

FIGS. 3A and 3B illustrate examples of MPE reporting schemes that support differential reporting for MPE values in accordance with aspects of the present disclosure.

As shown in FIG. 3A, a UE may employ a differential reporting scheme 300 in which a first MPE value is used as a reference value for one or more subsequent differential MPE values. For example, a UE may make measure, determine, or select multiple MPE values (e.g., MPE 1 305-*a*, MPE 2 305-*b*, and MPE 3 305-*c*). The UE may transmit the MPE 1 305-*a* as the actual value (represented by measurement 310-*a*). The UE may also transmit MPE 2 305-*b* and MPE 3 305-*c* as differential values relative to the value of MPE 1 305-*a* or measurement 310-*a* (e.g., as represented by measurement 310-*b* corresponding to a differential value of MPE 2 305-*b* and measurement 310-*c* corresponding to a differential value of MPE 3 305-*c*). In the example shown in FIG. 3A, the differential values are all reported relative to a single reference MPE value.

FIG. 3B depicts an example MPE reporting scheme 302. In FIG. 3B, a UE may employ a differential reporting scheme in which a differential MPE value may be based on an immediately preceding MPE value. For example, a UE may measure, determine, or select multiple MPE values (e.g., MPE 1 305-*d*, MPE 2 305-*e*, and MPE 3 305-*f*). The UE may transmit the MPE 1 305-*d* as an actual value (represented by measurement 310-*a*). The UE may transmit MPE 2 305-*e* as a differential value (represented by measurement 310-*e*) that takes MPE 1 305-*d* (represented by measurement 310-*d*) as a reference value. In this way, MPE 2 305-*e* is reported relative to the immediately preceding MPE value (in this case, MPE 1 305-*d*). The UE may transmit MPE 3 305-*f* as a differential value (represented by measurement 310-*f*) that takes the differential value of MPE 2 305-*e* (represented by measurement 310-*e*) as a reference value. In this way, MPE 3 305-*f* is reported relative to the immediately preceding MPE value (in this case, MPE 2 305-*e*). In some examples, each MPE value (or all MPE values except a first MPE value) may be expressed as differential values employing an immediately preceding value as a reference value for the differential value.

Figure 4A:
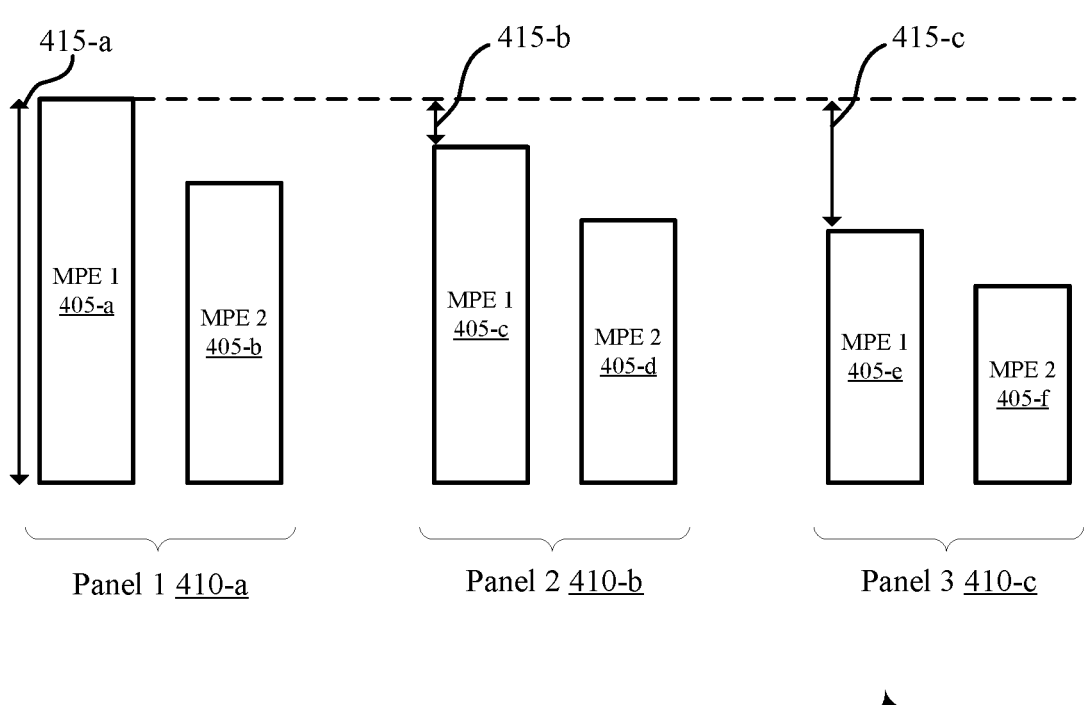
FIGS. 4A and 4B illustrate examples of MPE reporting schemes.
Figure 4B:
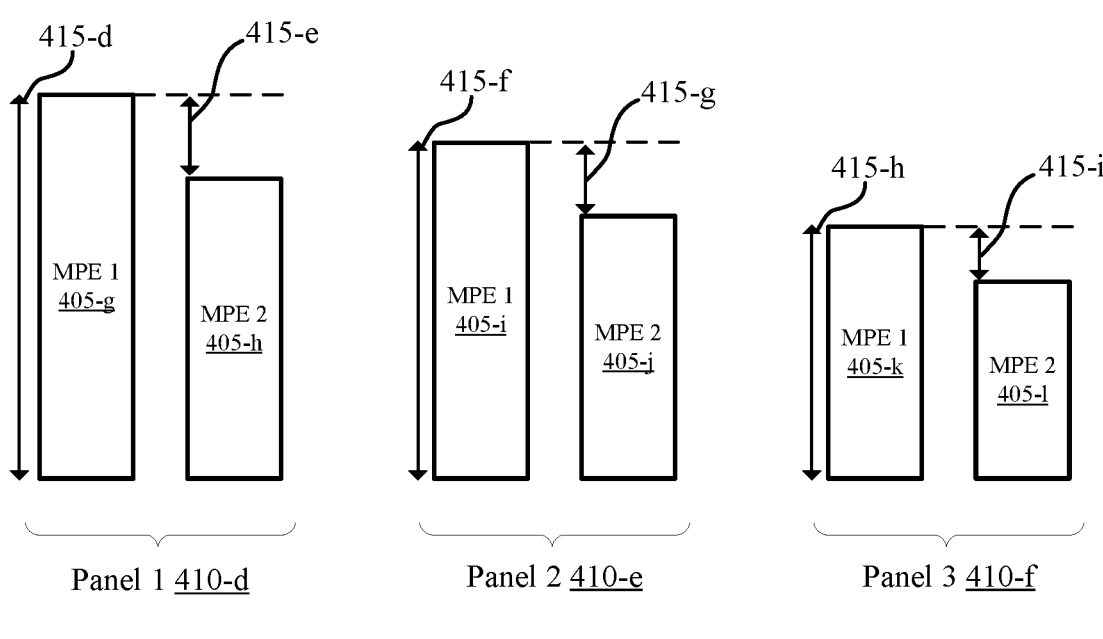

FIGS. 4A and 4B illustrate examples of MPE reporting schemes that support differential reporting for MPE values in accordance with aspects of the present disclosure.

In FIG. 4A, a "cross-panel" reporting scheme 400 may be employed. In such a scheme, a single MPE value may be used as a reference value for differential reporting of one or more additional MPE values. For example, a UE may measure, determine, select, or transmit MPE 1 405-*a* as a first MPE value used as a reference value for transmission of additional MPE values that may be associated with one or more antenna panels. Though MPE 1 405-*a* may be associated with panel 1 410-*a*, the UE may use MPE 1 405-*a* as a reference value for one or more MPE values associated with panel 2 410-*b* and panel 3 410-*c*. For example, the UE may report MPE 1 405-*c* associated with panel 2 410-*b* as a differential value (represented by measurement 415-*b*) taking MPE 1 (represented by measurement 415-*a*) as a reference value and the UE may report MPE 1 405-*e* associated with panel 3 410-*c* as a differential value (represented by measurement 415-*c*) taking MPE 1 (represented by measurement 415-*a*) as a reference value. The UE may report additional MPE values (e.g., MPE 2 405-*b*, MPE 2 405-*d*, and MPE 2 405-*f*) as differential values taking MPE 1 405-*a*(represented by measurement 415-*a*) as a reference value, even though they may be associated with a different panel (e.g., panel 2 410-*b* or panel 3 410-*c*). Such a scheme may employ aspects of a reporting scheme in which a single MPE value serves as a reference value for one or more additional MPE values, such as the approach discussed in relation to FIG. 3A.

In some examples, a UE may use an approach such as that described in relation to FIG. 3B in a cross-panel fashion, in which the UE reports each MPE value (e.g., except for the first MPE value) as a differential value taking the immediately preceding MPE value as a reference value. For example, the UE may transmit the following: 1) MPE 2 405-*b* as a differential value that takes MPE 1 405-*a* as a reference value; 2) MPE 1 405-*c* as a differential value that takes MPE 2 405-*b* as a reference value; 3) MPE 2 405-*d* as a differential value that takes MPE 1 405-*c* as a reference value; 4) MPE 1 405-*e* as a differential value that takes MPE 2 405-*d* as a reference value; and 5) MPE 2 405-*f* as a differential value that takes MPE 1 405-*e* as a reference value.

In some examples, a UE may report one or more additional MPE values according to the various techniques described herein. For example, the UE may report MPE 2 405-*d* as a differential value taking MPE 1 405-*a* as a reference value (e.g., using a cross panel approach for multiple MPE values for multiple panels). In other examples, the UE may employ a "hybrid" approach, in which the UE reports an MPE value from each panel (e.g., MPE 1 405-*c* and MPE 1 405-*e* from panel 2 410-*b* and panel 3 410-*c*, respectively) as a differential value taking a single MPE value (e.g., MPE 1 405-*a*) as a reference value. In turn, the UE may report each additional MPE value from each additional panel (e.g., MPE 2 405-*d*, and MPE 2 405-*f*) as differential values relative to the MPE value from that panel (e.g., MPE 1 405-*c* and MPE 1 405-*e* from panel 2 410-*b* and panel 3 410-*c*, respectively) that was reported relative to the first single MPE value (e.g., MPE 1 405-*a*) each of these MPE values reported. In this way, the UE may report a single MPE value as a first reference value to which additional MPE values may refer to, and these additional MPE values may be references for other MPE values of the same panel.

As shown in FIG. 4B, A UE may employ a "per-panel" MPE reporting scheme 402 in which the UE transmits one or more MPE values as differential values taking another MPE value from a same panel as a reference value for the differential value. For example, and as shown in FIG. 4B, a UE may report MPE 1 405-*g*, MPE 1 405-*i*, and MPE 1 405-*k* as actual values (represented by measurement 415-*d*, measurement 415-*f*, and measurement 415-*h*k, respectively). The UE may also report one or more additional MPE values (e.g., MPE 2 405-*h*, MPE 2 405-*j*, and MPE 2 405-*l*) as differential values (represented by measurement 415-*e*, measurement 415-*g*, and measurement 415-*i*, respectively) taking an MPE value from a same panel (e.g., MPE 1 405-*g*, MPE 1 405-*i*, and MPE 1 405-*k*, respectively, represented by measurement 415-*d*, measurement 415-*f*, and measurement 415-*h*, respectively) as reference values for the differential values. The UE may report additional MPE values for each panel employing various approaching for reporting (e.g., the single reference approach described in relation to FIG. 3A or the "cascading" approach described in relation to FIG. 3B).

FIGS. 5A, 5B, and 5C illustrate examples of MPE reporting schemes that support differential reporting for MPE values in accordance with aspects of the present disclosure. The various reports depicted herein may be, in some examples, CSI reports or other types of reports, and may include one or more CSI fields.

FIG. 5A depicts an exemplary MPE report 500. A UE may transmit the report 500 and may include "per-beam" MPE reporting in the report. For example, the report 500 may include one or more CRI or SSBRI indications, which may each be associated with a transmission beam. The report 500 may also include a first MPE value, and one or more additional MPE values that may be differential values that may take the first MPE value as a reference value. In some examples, the UE may transmit the report 500 that may reflect one or more approaches to MPE reporting as described herein.

FIG. 5B depicts an exemplary MPE report 502. A UE may transmit the report 502 and may include "per-panel" MPE reporting in the report. For example, the UE may prepare or transmit the report 502 that may include one or more panel IDs, which may each be associated with a panel of the UE. The report 502 may also include a first MPE value, and one or more additional MPE values that may be differential values that may take the first MPE value as a reference value. In some examples, the report 502 may reflect one or more approaches to MPE reporting as described herein.

FIG. 5C depicts an exemplary MPE report 504. A UE may transmit the report 504 and may include both "per-panel" and "per-beam" MPE reporting in the report. For example, the UE may prepare or transmit the report 504 that may include one or more panel IDs, which may each be associated with a panel of the UE, and may be included in multiple panel reports (e.g., panel 1 report 505-*a* and panel 2 report 505-*b*). The UE may also prepare or transmit the report 504 that may include one or more CRI or SSBRI indications, which may each be associated with a transmission beam, and may be included in one or more of the panel reports 505. The report 504 may also include a first MPE value for each panel report (e.g., panel reports 505), and one or more additional MPE values that may be differential values in each panel report (e.g., panel reports 505). The one or more additional MPE values may take the first MPE value of a same panel report as a reference value. In some examples, the report 504 may reflect one or more approaches to MPE reporting as described herein.

Figure 6:
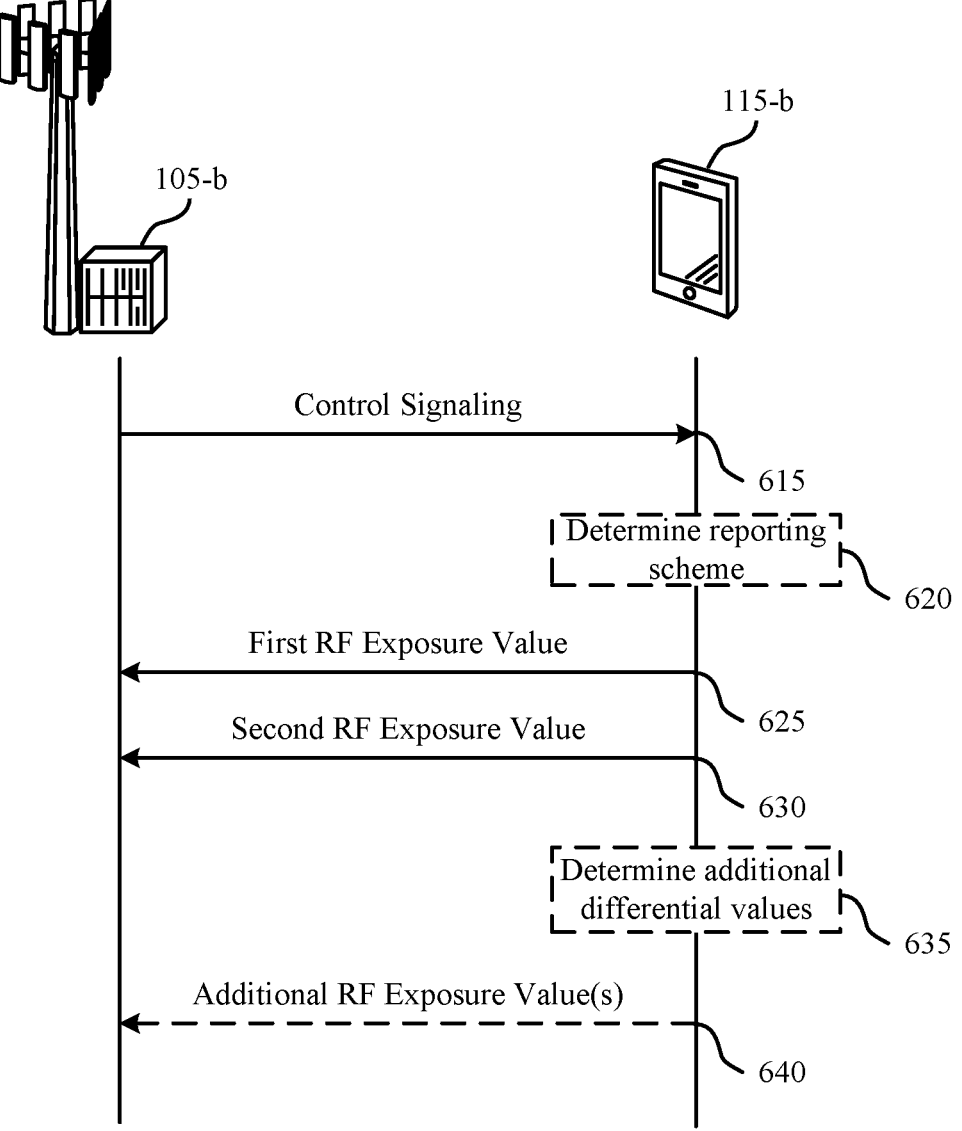
FIG. 6 illustrates an example of a process flow.

FIG. 6 illustrates an example of a process flow 600. The process flow 600 may implement various aspects of the present disclosure described with reference to FIGS. 1-3. The process flow 600 may include a base station 105-*b*, and a UE 115-*b*, which may be examples of base station 105 and UE 115 as described with reference to FIGS. 1-3. In some examples, the UE 115-*b* may be configured to report multiple MPE values to the base station 105-*b* in accordance with the approaches discussed herein.

In the following description of the process flow 600, the operations between the base station 105-*b* and the UE 115-*b* may be performed in different orders or at different times.

Some operations may also be left out of the process flow 600, or other operations may be added. Although the base station 105-*d* and the UE 115-*b* are shown performing the operations of the process flow 600, some aspects of some operations may also be performed by one or more other wireless devices.

At 615, the UE 115-*b* may receive control signaling that may include an indication that the UE may be configured to report multiple values associated with maximum permissible exposure at the UE. Each of the multiple values may be of a same type but associated with different transmission aspects of the UE, and the different transmission aspects may include at least different transmission beams of the UE or different antenna panels of the UE. In some examples, the first transmission aspect may be a first antenna panel of the UE and the second transmission aspect may be a second antenna panel of the UE. In some examples, the first transmission aspect may be a first transmission beam of the UE and the second transmission aspect may be a second transmission beam of the UE.

At 620, the UE 115-*b* may determine, from the control signaling, a differential maximum permissible exposure reporting scheme that may be used by the UE for transmitting the multiple values using respective differential values. In some examples, the UE may determine, from the control signaling, that the multiple values may be reported per transmission beam of a given antenna panel of the UE, per antenna panel for a given transmission beam of the UE, or a combination thereof.

At 625, the UE 115-*b* may transmit a first maximum permissible exposure value of the multiple values. The first maximum permissible exposure value may be associated with a first transmission aspect of the UE. In some examples, the UE 115-*b* may transmit the first MPE value in a report. In some examples, the UE 115-*b* may transmit the first maximum permissible exposure value as a power headroom report value. In some examples, the power headroom report value may be associated with a TCI state or a joint TCI state. In some examples, the power headroom report value may be associated with at least one of a reported SSBRI, a CRI, or a panel indication. In some examples. the UE 115-*b* may transmit the first maximum permissible exposure value as an RSRP report value or an SINR report value. In some examples, the RSRP report value or SINR report value may be associated with at least one of a reported SSBRI, a CRI, or a panel indication.

At 630, the UE 115-*b* may transmit a second maximum permissible exposure value of the multiple values. The second maximum permissible exposure value may be associated with a second transmission aspect of the UE and may be transmitted as a differential value based at least in part on the first maximum permissible exposure value. In some examples, the UE 115-*b* may transmit the second MPE value in a report. In some examples, the second maximum permissible exposure value may include fewer bits than the first maximum permissible exposure value. In some examples, the UE 115-*b* may transmit the second maximum permissible exposure value as a power headroom report value. In some examples, the power headroom report value may be associated with a TCI state or a joint TCI state. In some examples, the power headroom report value may be associated with at least one of a reported SSBRI, a CRI, or a panel indication. In some examples. the UE 115-*b* may transmit the second maximum permissible exposure value as an RSRP report value or an SINR report value. In some examples, the RSRP report value or SINR report value may be associated with at least one of a reported SSBRI, a CRI, or a panel indication.

At 635, the UE 115-*b* may determine one or more additional differential values with respect to a non-quantized version or a quantized version of the first maximum permissible exposure value.

At 640, the UE 115-*b* may transmit additional maximum permissible exposure values of the multiple values. The additional MPE values may be transmitted in a report. The additional maximum permissible exposure values may each be associated with a corresponding additional transmission aspect of the UE and may each be transmitted as an additional differential value based at least in part on an immediately preceding differential value within the report. Alternatively, or additionally, each additional MPE value may be transmitted as an additional differential value based at least in part on the first maximum permissible exposure value.

Figure 7:
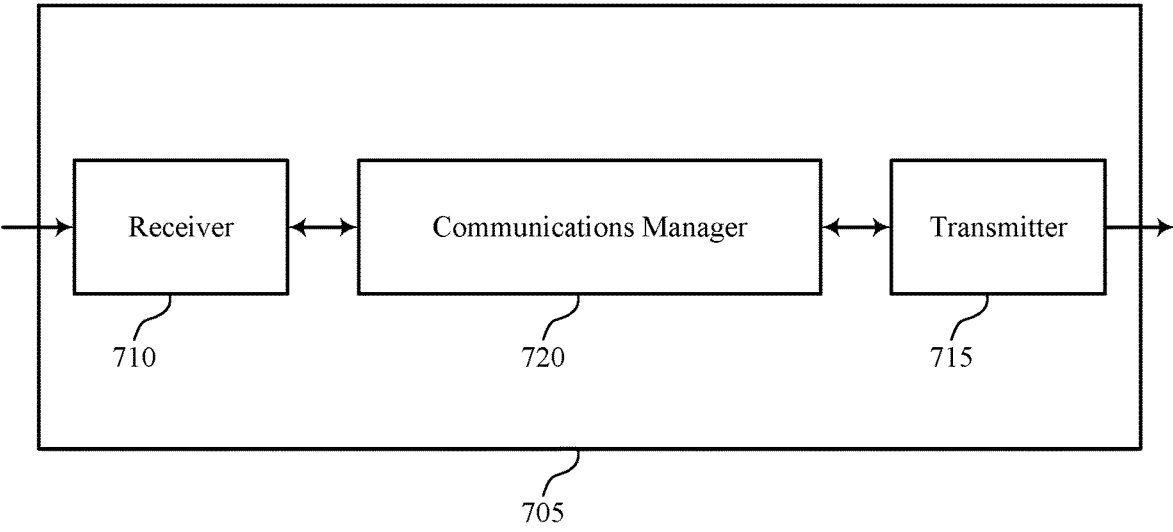
FIGS. 7 and 8 show block diagrams of devices.

FIG. 7 shows a block diagram 700 of a device 705. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to differential report for maximum permissible exposure values). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to differential report for maximum permissible exposure values). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of differential report for maximum permissible exposure values as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for receiving control signaling that includes an indication that the UE is configured to report multiple values associated with maximum permissible exposure at the UE, each of the multiple values being of a same type but associated with different transmission aspects of the UE, the different transmission aspects including at least different transmission beams of the UE or different antenna panels of the UE. The communications manager 720 may be configured as or otherwise support a means for transmitting a first maximum permissible exposure value of the multiple values, the first maximum permissible exposure value associated with a first transmission aspect of the UE. The communications manager 720 may be configured as or otherwise support a means for transmitting a second maximum permissible exposure value of the multiple values, the second maximum permissible exposure value associated with a second transmission aspect of the UE and transmitted as a differential value based on the first maximum permissible exposure value.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing, reduced power consumption, or more efficient utilization of communication resources.

Figure 8:
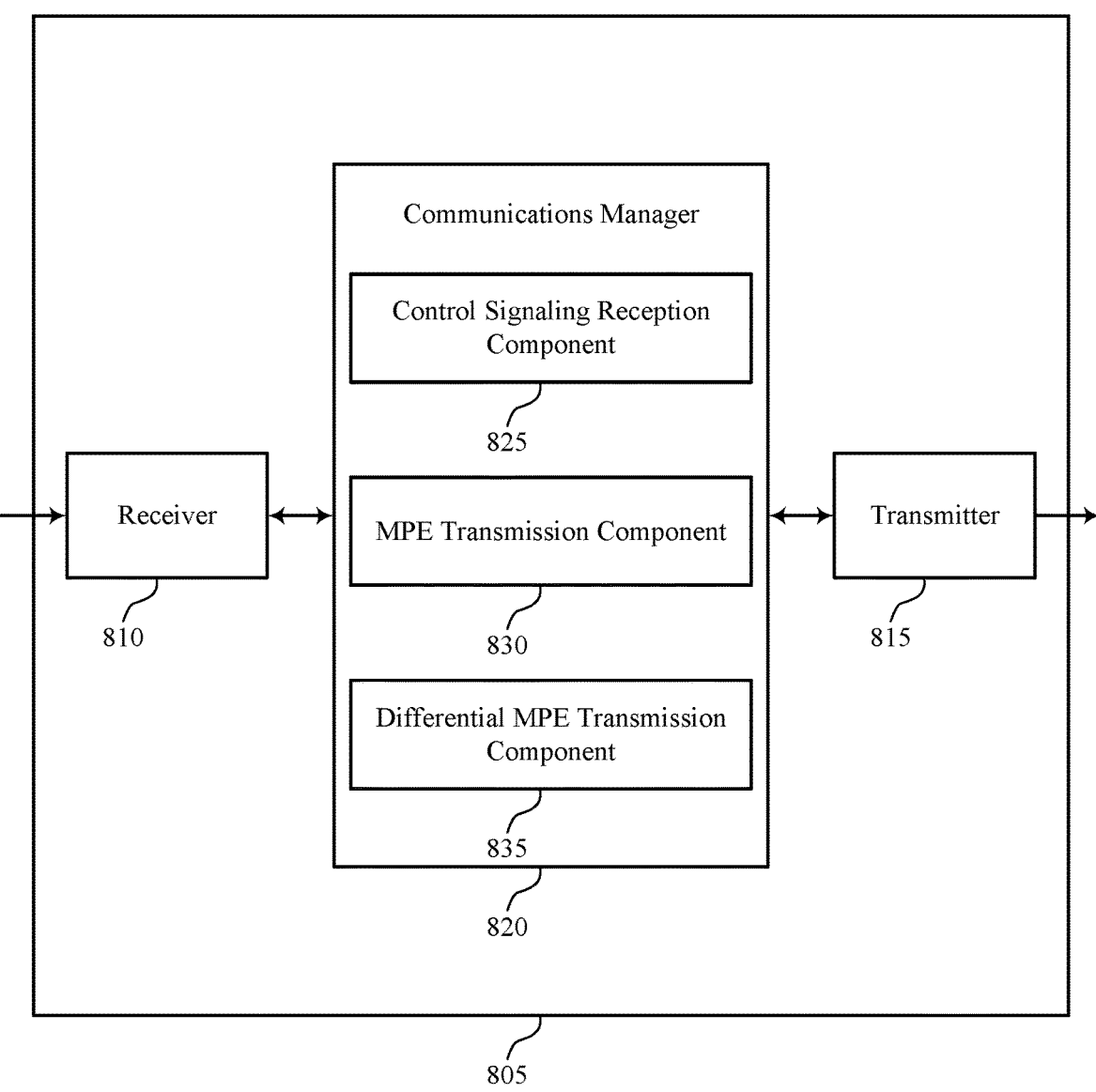

FIG. 8 shows a block diagram 800 of a device 805. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to differential report for maximum permissible exposure values). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to differential report for maximum permissible exposure values). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of differential report for maximum permissible exposure values as described herein. For example, the communications manager 820 may include a control signaling reception component 825, an MPE transmission component 830, a differential MPE transmission component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The control signaling reception component 825 may be configured as or otherwise support a means for receiving control signaling that includes an indication that the UE is configured to report multiple values associated with maximum permissible exposure at the UE, each of the multiple values being of a same type but associated with different transmission aspects of the UE, the different transmission aspects including at least different transmission beams of the UE or different antenna panels of the UE. The MPE transmission component 830 may be configured as or otherwise support a means for transmitting a first maximum permissible exposure value of the multiple values, the first maximum permissible exposure value associated with a first transmission aspect of the UE. The differential MPE transmission component 835 may be configured as or otherwise support a means for transmitting a second maximum permissible exposure value of the multiple values, the second maximum permissible exposure value associated with a second transmission aspect of the UE and transmitted as a differential value based on the first maximum permissible exposure value.

Figure 9:
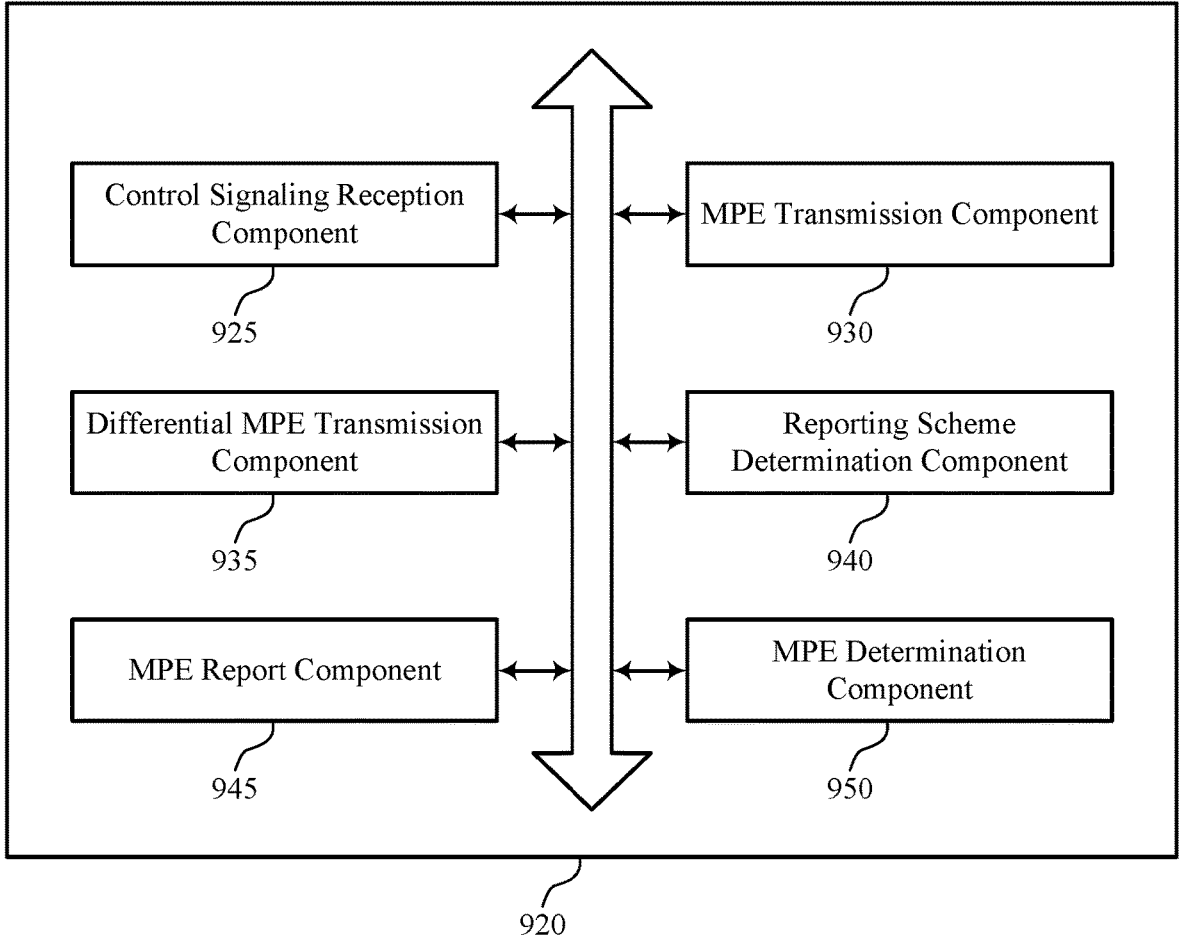
FIG. 9 shows a block diagram of a communications manager.

FIG. 9 shows a block diagram 900 of a communications manager 920. The communications manager 920 may be an example of aspects of a communications manager 720, a communications manager 820, or both, as described herein. The communications manager 920, or various components thereof, may be an example of means for performing various aspects of differential report for maximum permissible exposure values as described herein. For example, the communications manager 920 may include a control signaling reception component 925, an MPE transmission component 930, a differential MPE transmission component 935, a reporting scheme determination component 940, an MPE report component 945, an MPE determination component 950, or any combination thereof. Each of these components may communicate, directly or indirectly, with one another (e.g., via one or more buses).

The communications manager 920 may support wireless communications at a UE in accordance with examples as disclosed herein. The control signaling reception component 925 may be configured as or otherwise support a means for receiving control signaling that includes an indication that the UE is configured to report multiple values associated with maximum permissible exposure at the UE, each of the multiple values being of a same type but associated with different transmission aspects of the UE, the different transmission aspects including at least different transmission beams of the UE or different antenna panels of the UE. The MPE transmission component 930 may be configured as or otherwise support a means for transmitting a first maximum permissible exposure value of the multiple values, the first maximum permissible exposure value associated with a first transmission aspect of the UE. The differential MPE transmission component 935 may be configured as or otherwise support a means for transmitting a second maximum permissible exposure value of the multiple values, the second maximum permissible exposure value associated with a second transmission aspect of the UE and transmitted as a differential value based on the first maximum permissible exposure value.

In some examples, the differential MPE transmission component 935 may be configured as or otherwise support a means for transmitting the first maximum permissible exposure value, the second maximum permissible exposure value, and additional maximum permissible exposure values of the multiple values in a report, the additional maximum permissible exposure values each associated with a corresponding additional transmission aspect of the UE and each transmitted as an additional differential value based on an immediately preceding differential value within the report.

In some examples, the differential MPE transmission component 935 may be configured as or otherwise support a means for transmitting the first maximum permissible exposure value, the second maximum permissible exposure value, and additional maximum permissible exposure values of the multiple values in a report, the additional maximum permissible exposure values each associated with a corresponding additional transmission aspect of the UE and each transmitted as an additional differential value based on the first maximum permissible exposure value.

In some examples, the MPE determination component 950 may be configured as or otherwise support a means for determining the additional differential values with respect to a non-quantized version or a quantized version of the first maximum permissible exposure value.

In some examples, the reporting scheme determination component 940 may be configured as or otherwise support a means for determining, from the control signaling, a differential maximum permissible exposure reporting scheme that is to be used by the UE for transmitting the multiple values using respective differential values.

In some examples, the reporting scheme determination component 940 may be configured as or otherwise support a means for determining, from the control signaling, that the multiple values are to be reported per transmission beam of a given antenna panel of the UE, per antenna panel for a given transmission beam of the UE, or a combination thereof.

In some examples, the first transmission aspect is a first antenna panel of the UE and the second transmission aspect is a second antenna panel of the UE.

In some examples, the first transmission aspect is a first transmission beam of the UE and the second transmission aspect is a second transmission beam of the UE.

In some examples, the second maximum permissible exposure value includes fewer bits than the first maximum permissible exposure value.

In some examples, the MPE report component 945 may be configured as or otherwise support a means for transmitting the first maximum permissible exposure value and the second maximum permissible exposure value as respective power headroom report values.

In some examples, the respective power headroom report values are each associated with an activated uplink transmission configuration indicator (TCI) state or a joint TCI state.

In some examples, the respective power headroom report values are each associated with at least one of a reported synchronization signal/physical broadcast channel block resource indicator (SSBRI), a channel state information reference signal resource indicator (CRI), or a panel indication.

In some examples, the MPE report component 945 may be configured as or otherwise support a means for transmitting the first maximum permissible exposure value and the second maximum permissible exposure value as respective reference signal received power report values or respective signal to interference and noise ratio report values.

In some examples, each of the respective reference signal received power report values or respective signal to interference and noise ratio report values is associated with at least one of a reported synchronization signal/physical broadcast channel block resource indicator (SSBRI), a channel state information reference signal resource indicator (CRI), or a panel indication.

Figure 10:
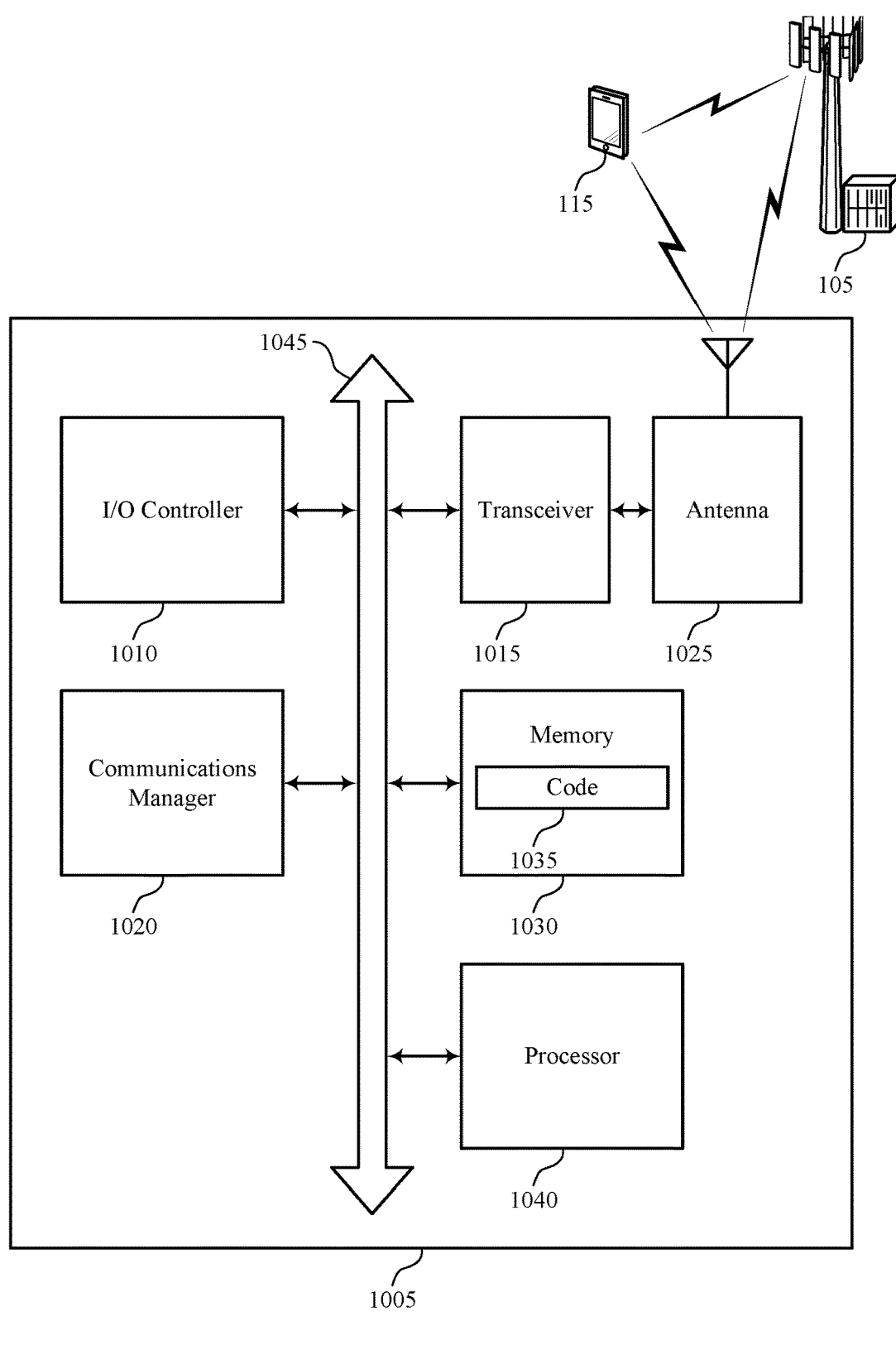
FIG. 10 shows a diagram of a system.

FIG. 10 shows a diagram of a system 1000 including a device 1005. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting differential report for maximum permissible exposure values). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving control signaling that includes an indication that the UE is configured to report multiple values associated with maximum permissible exposure at the UE, each of the multiple values being of a same type but associated with different transmission aspects of the UE, the different transmission aspects including at least different transmission beams of the UE or different antenna panels of the UE. The communications manager 1020 may be configured as or otherwise support a means for transmitting a first maximum permissible exposure value of the multiple values, the first maximum permissible exposure value associated with a first transmission aspect of the UE. The communications manager 1020 may be configured as or otherwise support a means for transmitting a second maximum permissible exposure value of the multiple values, the second maximum permissible exposure value associated with a second transmission aspect of the UE and transmitted as a differential value based on the first maximum permissible exposure value.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, or improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of differential report for maximum permissible exposure values as described herein, or the processor 1040 and the memory 1030 may be otherwise configured to perform or support such operations.

Figure 11:
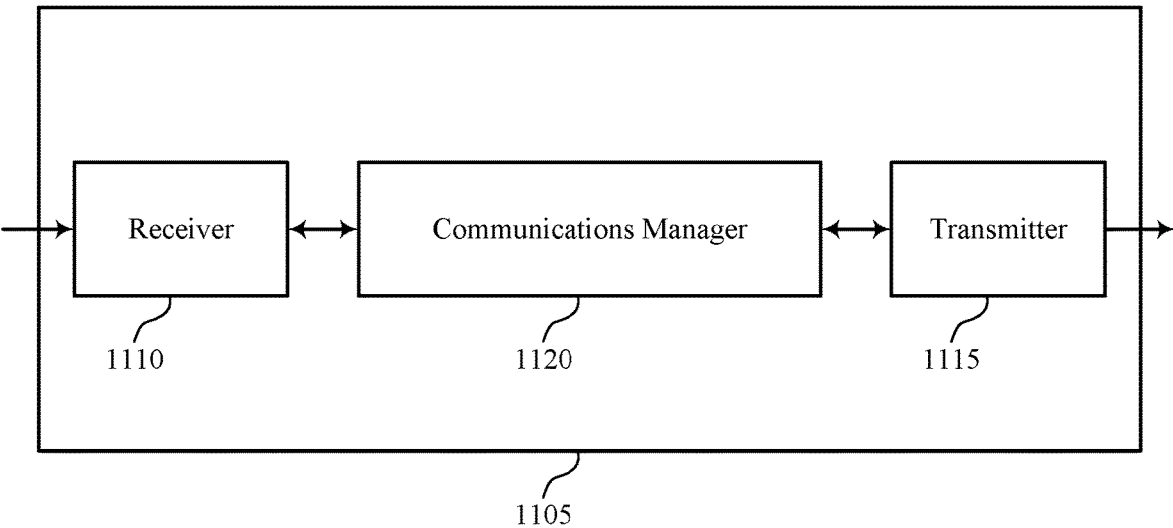
FIGS. 11 and 12 show block diagrams of devices.

FIG. 11 shows a block diagram 1100 of a device 1105. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to differential report for maximum permissible exposure values). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to differential report for maximum permissible exposure values). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of differential report for maximum permissible exposure values as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for transmitting control signaling that includes an indication that a UE is configured to report multiple values associated with maximum permissible exposure at the UE, each of the multiple values being of a same type but associated with different transmission aspects of the UE, the different transmission aspects including at least different transmission beams of the UE or different antenna panels of the UE. The communications manager 1120 may be configured as or otherwise support a means for receiving a first maximum permissible exposure value of the multiple values, the first maximum permissible exposure value associated with a first transmission aspect of the UE. The communications manager 1120 may be configured as or otherwise support a means for receiving a second maximum permissible exposure value of the multiple values, the second maximum permissible exposure value associated with a second transmission aspect of the UE and transmitted as a differential value based on the first maximum permissible exposure value.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing, reduced power consumption, or more efficient utilization of communication resources.

Figure 12:
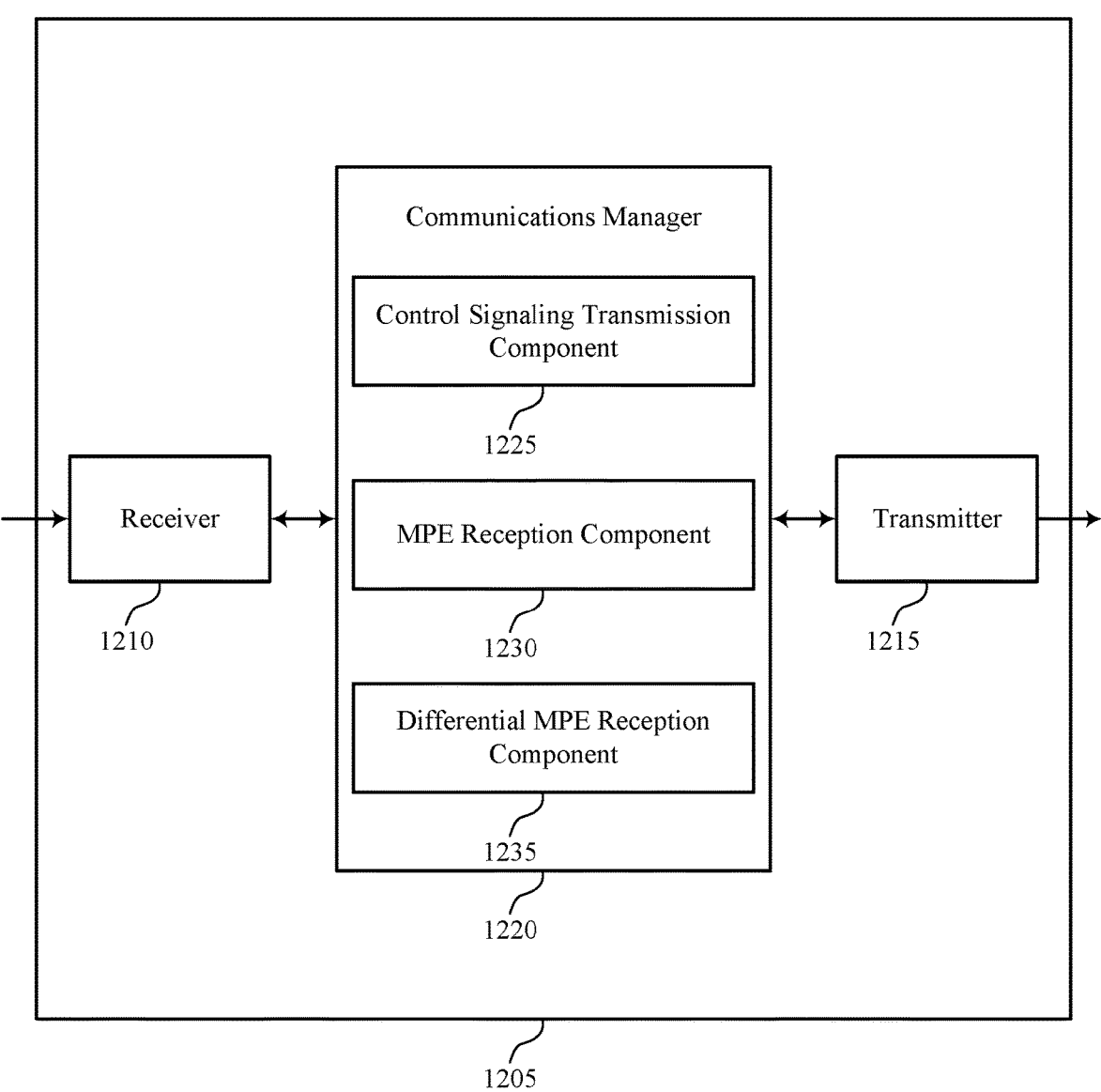

FIG. 12 shows a block diagram 1200 of a device 1205. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to differential report for maximum permissible exposure values). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to differential report for maximum permissible exposure values). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of differential report for maximum permissible exposure values as described herein. For example, the communications manager 1220 may include a control signaling transmission component 1225, an MPE reception component 1230, a differential MPE reception component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The control signaling transmission component 1225 may be configured as or otherwise support a means for transmitting control signaling that includes an indication that a UE is configured to report multiple values associated with maximum permissible exposure at the UE, each of the multiple values being of a same type but associated with different transmission aspects of the UE, the different transmission aspects including at least different transmission beams of the UE or different antenna panels of the UE. The MPE reception component 1230 may be configured as or otherwise support a means for receiving a first maximum permissible exposure value of the multiple values, the first maximum permissible exposure value associated with a first transmission aspect of the UE. The differential MPE reception component 1235 may be configured as or otherwise support a means for receiving a second maximum permissible exposure value of the multiple values, the second maximum permissible exposure value associated with a second transmission aspect of the UE and transmitted as a differential value based on the first maximum permissible exposure value.

Figure 13:
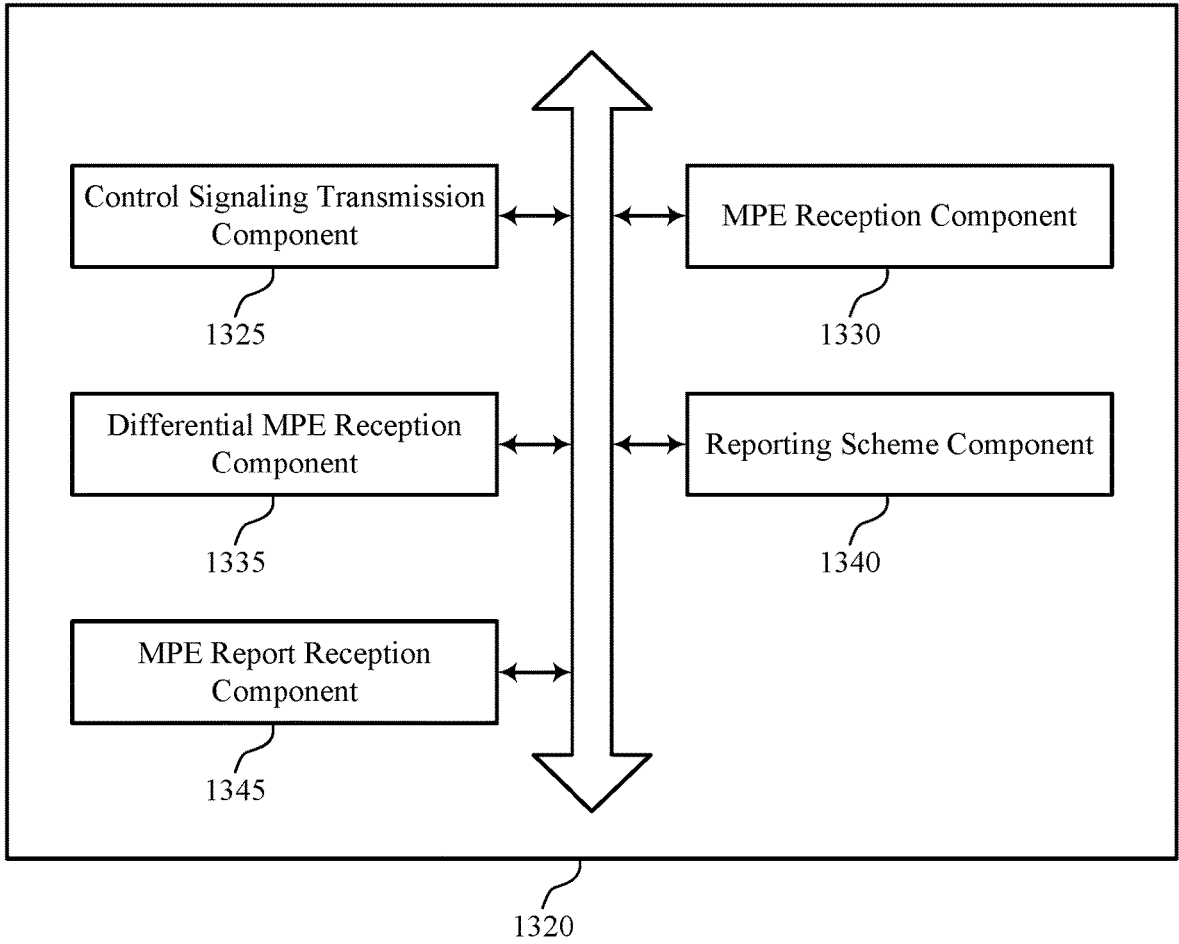
FIG. 13 shows a block diagram of a communications manager.

FIG. 13 shows a block diagram 1300 of a communications manager 1320. The communications manager 1320 may be an example of aspects of a communications manager 1120, a communications manager 1220, or both, as described herein. The communications manager 1320, or various components thereof, may be an example of means for performing various aspects of differential report for maximum permissible exposure values as described herein. For example, the communications manager 1320 may include a control signaling transmission component 1325, an MPE reception component 1330, a differential MPE reception component 1335, a reporting scheme component 1340, an MPE report reception component 1345, or any combination thereof. Each of these components may communicate, directly or indirectly, with one another (e.g., via one or more buses).

The communications manager 1320 may support wireless communications at a base station in accordance with examples as disclosed herein. The control signaling transmission component 1325 may be configured as or otherwise support a means for transmitting control signaling that includes an indication that a UE is configured to report multiple values associated with maximum permissible exposure at the UE, each of the multiple values being of a same type but associated with different transmission aspects of the UE, the different transmission aspects including at least different transmission beams of the UE or different antenna panels of the UE. The MPE reception component 1330 may be configured as or otherwise support a means for receiving a first maximum permissible exposure value of the multiple values, the first maximum permissible exposure value associated with a first transmission aspect of the UE. The differential MPE reception component 1335 may be configured as or otherwise support a means for receiving a second maximum permissible exposure value of the multiple values, the second maximum permissible exposure value associated with a second transmission aspect of the UE and transmitted as a differential value based on the first maximum permissible exposure value.

In some examples, the differential MPE reception component 1335 may be configured as or otherwise support a means for receiving the first maximum permissible exposure value, the second maximum permissible exposure value, and additional maximum permissible exposure values of the multiple values in a report, the additional maximum permissible exposure values each associated with a corresponding additional transmission aspect of the UE and each received as an additional differential value based on an immediately preceding differential value within the report.

In some examples, the differential MPE reception component 1335 may be configured as or otherwise support a means for receiving the first maximum permissible exposure value, the second maximum permissible exposure value, and additional maximum permissible exposure values of the multiple values in a report, the additional maximum permissible exposure values each associated with a corresponding additional transmission aspect of the UE and each received as an additional differential value based on the first maximum permissible exposure value.

In some examples, the MPE reception component 1330 may be configured as or otherwise support a means for determining the additional differential values with respect to a non-quantized version or a quantized version of the first maximum permissible exposure value.

In some examples, the reporting scheme component 1340 may be configured as or otherwise support a means for determining a differential maximum permissible exposure reporting scheme that is to be used by the UE for transmitting the multiple values using respective differential values.

In some examples, the reporting scheme component 1340 may be configured as or otherwise support a means for determining that the multiple values are to be reported per transmission beam of a given antenna panel of the UE, per antenna panel for a given transmission beam of the UE, or a combination thereof.

In some examples, the first transmission aspect is a first antenna panel of the UE and the second transmission aspect is a second antenna panel of the UE.

In some examples, the first transmission aspect is a first transmission beam of the UE and the second transmission aspect is a second transmission beam of the UE.

In some examples, the second maximum permissible exposure value includes fewer bits than the first maximum permissible exposure value.

In some examples, the MPE report reception component 1345 may be configured as or otherwise support a means for receiving the first maximum permissible exposure value and the second maximum permissible exposure value as respective power headroom report values.

In some examples, the respective power headroom report values are each associated with an activated uplink transmission configuration indicator (TCI) state or a joint TCI state.

In some examples, the respective power headroom report values are each associated with at least one of a reported synchronization signal/physical broadcast channel block resource indicator (SSBRI), a channel state information reference signal resource indicator (CRI), or a panel indication.

In some examples, the MPE report reception component 1345 may be configured as or otherwise support a means for receiving the first maximum permissible exposure value and the second maximum permissible exposure value as respective reference signal received power report values or respective signal to interference and noise ratio report values.

In some examples, each of the respective reference signal received power report values or respective signal to interference and noise ratio report values is associated with at least one of a reported synchronization signal/physical broadcast channel block resource indicator (SSBRI), a channel state information reference signal resource indicator (CRI), or a panel indication.

Figure 14:
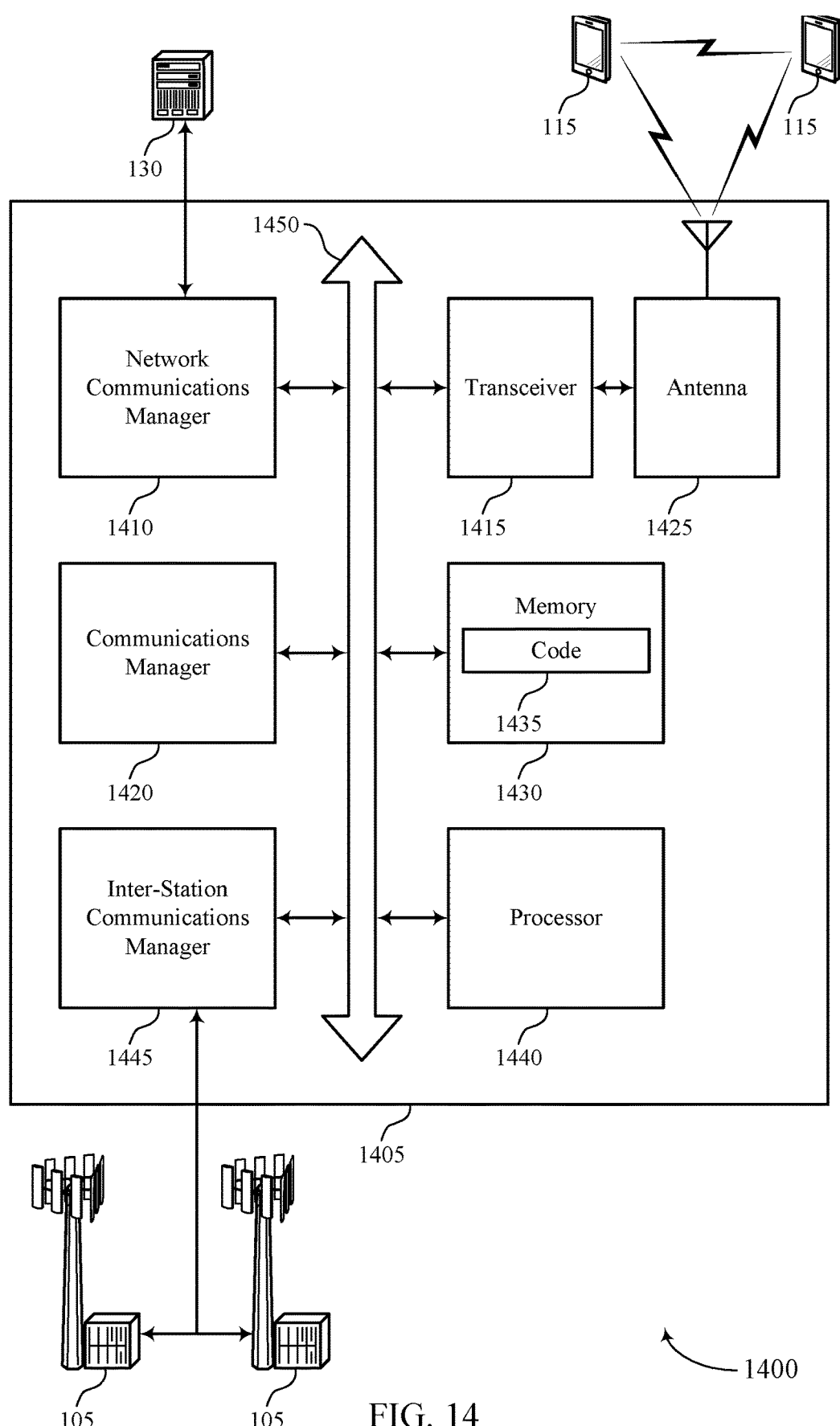
FIG. 14 shows a diagram of a system including a device.

FIG. 14 shows a diagram of a system 1400 including a device 1405. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting differential report for maximum permissible exposure values). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for transmitting control signaling that includes an indication that a UE is configured to report multiple values associated with maximum permissible exposure at the UE, each of the multiple values being of a same type but associated with different transmission aspects of the UE, the different transmission aspects including at least different transmission beams of the UE or different antenna panels of the UE. The communications manager 1420 may be configured as or otherwise support a means for receiving a first maximum permissible exposure value of the multiple values, the first maximum permissible exposure value associated with a first transmission aspect of the UE. The communications manager 1420 may be configured as or otherwise support a means for receiving a second maximum permissible exposure value of the multiple values, the second maximum permissible exposure value associated with a second transmission aspect of the UE and transmitted as a differential value based on the first maximum permissible exposure value.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, improved utilization of processing capability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of differential report for maximum permissible exposure values as described herein, or the processor 1440 and the memory 1430 may be otherwise configured to perform or support such operations.

FIG. 15 shows a flowchart illustrating a method 1500. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving control signaling that includes an indication that the UE is configured to report multiple values associated with maximum permissible exposure at the UE, each of the multiple values being of a same type but associated with different transmission aspects of the UE, the different transmission aspects including at least different transmission beams of the UE or different antenna panels of the UE. The operations of 1505 may be performed in accordance with examples as disclosed herein. In some examples, aspects of the operations of 1505 may be performed by a control signaling reception component 925 as described with reference to FIG. 9.

At 1510, the method may include transmitting a first maximum permissible exposure value of the multiple values, the first maximum permissible exposure value associated with a first transmission aspect of the UE. The operations of 1510 may be performed in accordance with examples as disclosed herein. In some examples, aspects of the operations of 1510 may be performed by an MPE transmission component 930 as described with reference to FIG. 9.

At 1515, the method may include transmitting a second maximum permissible exposure value of the multiple values, the second maximum permissible exposure value associated with a second transmission aspect of the UE and transmitted as a differential value based on the first maximum permissible exposure value. The operations of 1515 may be performed in accordance with examples as disclosed herein. In some examples, aspects of the operations of 1515 may be performed by a differential MPE transmission component 935 as described with reference to FIG. 9.

FIG. 16 shows a flowchart illustrating a method 1600. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving control signaling that includes an indication that the UE is configured to report multiple values associated with maximum permissible exposure at the UE, each of the multiple values being of a same type but associated with different transmission aspects of the UE, the different transmission aspects including at least different transmission beams of the UE or different antenna panels of the UE. The operations of 1605 may be performed in accordance with examples as disclosed herein. In some examples, aspects of the operations of 1605 may be performed by a control signaling reception component 925 as described with reference to FIG. 9.

At 1610, the method may include transmitting a first maximum permissible exposure value of the multiple values, the first maximum permissible exposure value associated with a first transmission aspect of the UE. The operations of 1610 may be performed in accordance with examples as disclosed herein. In some examples, aspects of the operations of 1610 may be performed by an MPE transmission component 930 as described with reference to FIG. 9.

At 1615, the method may include transmitting a second maximum permissible exposure value of the multiple values, the second maximum permissible exposure value associated with a second transmission aspect of the UE and transmitted as a differential value based on the first maximum permissible exposure value. The operations of 1615 may be performed in accordance with examples as disclosed herein. In some examples, aspects of the operations of 1615 may be performed by a differential MPE transmission component 935 as described with reference to FIG. 9.

At 1620, the method may include determining the additional differential values with respect to a non-quantized version or a quantized version of the first maximum permissible exposure value. The operations of 1620 may be performed in accordance with examples as disclosed herein. In some examples, aspects of the operations of 1620 may be performed by an MPE determination component 950 as described with reference to FIG. 9.

At 1625, the method may include transmitting the first maximum permissible exposure value, the second maximum permissible exposure value, and additional maximum permissible exposure values of the multiple values in a report, the additional maximum permissible exposure values each associated with a corresponding additional transmission aspect of the UE and each transmitted as an additional differential value based on the first maximum permissible exposure value. The operations of 1625 may be performed in accordance with examples as disclosed herein. In some examples, aspects of the operations of 1625 may be performed by a differential MPE transmission component 935 as described with reference to FIG. 9.

FIG. 17 shows a flowchart illustrating a method 1700. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving control signaling that includes an indication that the UE is configured to report multiple values associated with maximum permissible exposure at the UE, each of the multiple values being of a same type but associated with different transmission aspects of the UE, the different transmission aspects including at least different transmission beams of the UE or different antenna panels of the UE. The operations of 1705 may be performed in accordance with examples as disclosed herein. In some examples, aspects of the operations of 1705 may be performed by a control signaling reception component 925 as described with reference to FIG. 9.

At 1710, the method may include determining, from the control signaling, that the multiple values are to be reported per transmission beam of a given antenna panel of the UE, per antenna panel for a given transmission beam of the UE, or a combination thereof. The operations of 1710 may be performed in accordance with examples as disclosed herein. In some examples, aspects of the operations of 1710 may be performed by a reporting scheme determination component 940 as described with reference to FIG. 9.

At 1715, the method may include transmitting a first maximum permissible exposure value of the multiple values, the first maximum permissible exposure value associated with a first transmission aspect of the UE. The operations of 1715 may be performed in accordance with examples as disclosed herein. In some examples, aspects of the operations of 1715 may be performed by an MPE transmission component 930 as described with reference to FIG. 9.

At 1720, the method may include transmitting a second maximum permissible exposure value of the multiple values, the second maximum permissible exposure value associated with a second transmission aspect of the UE and transmitted as a differential value based on the first maximum permissible exposure value. The operations of 1720 may be performed in accordance with examples as disclosed herein. In some examples, aspects of the operations of 1720 may be performed by a differential MPE transmission component 935 as described with reference to FIG. 9.

FIG. 18 shows a flowchart illustrating a method 1800. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting control signaling that includes an indication that a UE is configured to report multiple values associated with maximum permissible exposure at the UE, each of the multiple values being of a same type but associated with different transmission aspects of the UE, the different transmission aspects including at least different transmission beams of the UE or different antenna panels of the UE. The operations of 1805 may be performed in accordance with examples as disclosed herein. In some examples, aspects of the operations of 1805 may be performed by a control signaling transmission component 1325 as described with reference to FIG. 13.

At 1810, the method may include receiving a first maximum permissible exposure value of the multiple values, the first maximum permissible exposure value associated with a first transmission aspect of the UE. The operations of 1810 may be performed in accordance with examples as disclosed herein. In some examples, aspects of the operations of 1810 may be performed by an MPE reception component 1330 as described with reference to FIG. 13.

At 1815, the method may include receiving a second maximum permissible exposure value of the multiple values, the second maximum permissible exposure value associated with a second transmission aspect of the UE and transmitted as a differential value based on the first maximum permissible exposure value. The operations of 1815 may be performed in accordance with examples as disclosed herein. In some examples, aspects of the operations of 1815 may be performed by a differential MPE reception component 1335 as described with reference to FIG. 13.

FIG. 19 shows a flowchart illustrating a method 1900. The operations of the method 1900 may be implemented by a base station or its components as described herein. For example, the operations of the method 1900 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1905, the method may include transmitting control signaling that includes an indication that a UE is configured to report multiple values associated with maximum permissible exposure at the UE, each of the multiple values being of a same type but associated with different transmission aspects of the UE, the different transmission aspects including at least different transmission beams of the UE or different antenna panels of the UE. The operations of 1905 may be performed in accordance with examples as disclosed herein. In some examples, aspects of the operations of 1905 may be performed by a control signaling transmission component 1325 as described with reference to FIG. 13.

At 1910, the method may include receiving a first maximum permissible exposure value of the multiple values, the first maximum permissible exposure value associated with a first transmission aspect of the UE. The operations of 1910 may be performed in accordance with examples as disclosed herein. In some examples, aspects of the operations of 1910 may be performed by an MPE reception component 1330 as described with reference to FIG. 13.

At 1915, the method may include receiving a second maximum permissible exposure value of the multiple values, the second maximum permissible exposure value associated with a second transmission aspect of the UE and transmitted as a differential value based on the first maximum permissible exposure value. The operations of 1915 may be performed in accordance with examples as disclosed herein. In some examples, aspects of the operations of 1915 may be performed by a differential MPE reception component 1335 as described with reference to FIG. 13.

At 1920, the method may include determining the additional differential values with respect to a non-quantized version or a quantized version of the first maximum permissible exposure value. The operations of 1920 may be performed in accordance with examples as disclosed herein. In some examples, aspects of the operations of 1920 may be performed by an MPE reception component 1330 as described with reference to FIG. 13.

At 1925, the method may include receiving the first maximum permissible exposure value, the second maximum permissible exposure value, and additional maximum permissible exposure values of the multiple values in a report, the additional maximum permissible exposure values each associated with a corresponding additional transmission aspect of the UE and each received as an additional differential value based on the first maximum permissible exposure value. The operations of 1925 may be performed in accordance with examples as disclosed herein. In some examples, aspects of the operations of 1925 may be performed by a differential MPE reception component 1335 as described with reference to FIG. 13.

Figure 20:
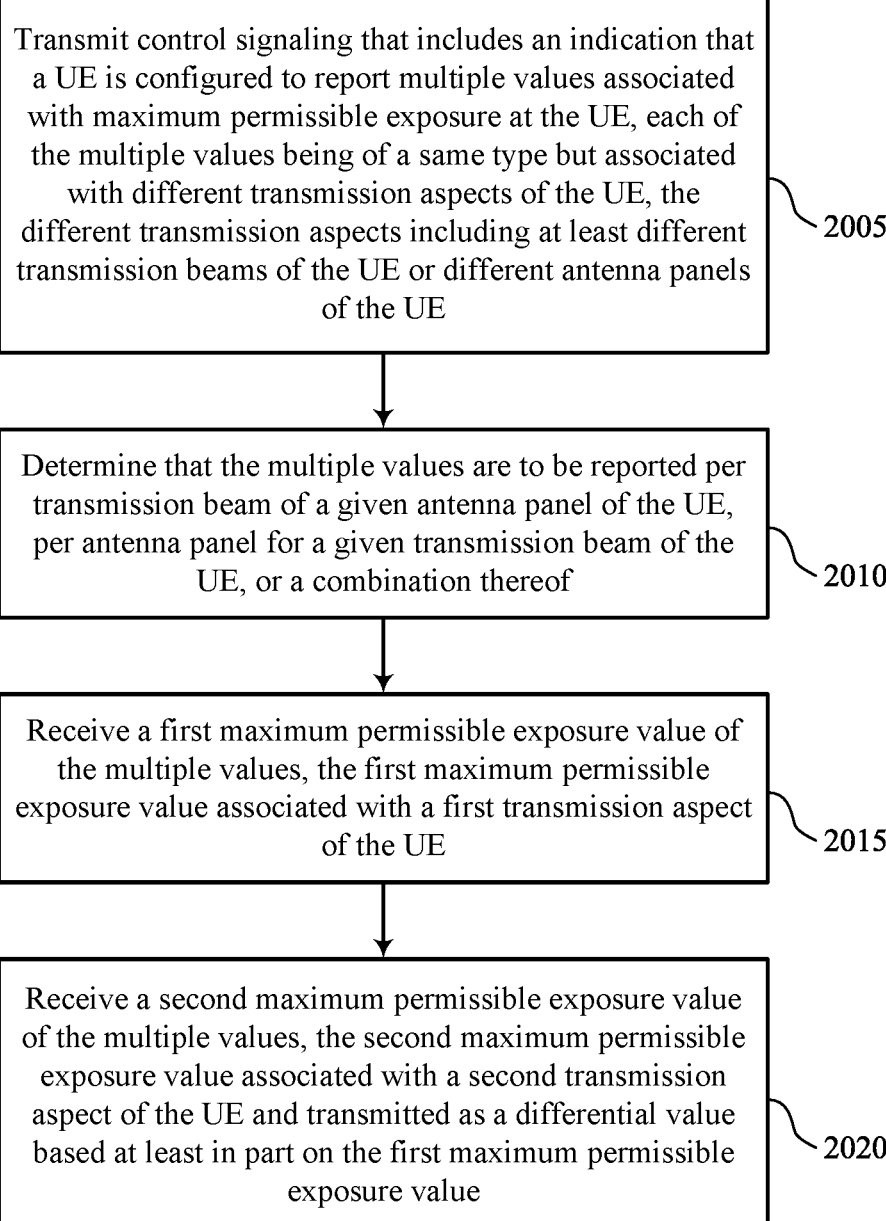

FIG. 20 shows a flowchart illustrating a method 2000. The operations of the method 2000 may be implemented by a base station or its components as described herein. For example, the operations of the method 2000 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2005, the method may include transmitting control signaling that includes an indication that a UE is configured to report multiple values associated with maximum permissible exposure at the UE, each of the multiple values being of a same type but associated with different transmission aspects of the UE, the different transmission aspects including at least different transmission beams of the UE or different antenna panels of the UE. The operations of 2005 may be performed in accordance with examples as disclosed herein. In some examples, aspects of the operations of 2005 may be performed by a control signaling transmission component 1325 as described with reference to FIG. 13.

At 2010, the method may include determining that the multiple values are to be reported per transmission beam of a given antenna panel of the UE, per antenna panel for a given transmission beam of the UE, or a combination thereof. The operations of 2010 may be performed in accordance with examples as disclosed herein. In some examples, aspects of the operations of 2010 may be performed by a reporting scheme component 1340 as described with reference to FIG. 13.

At 2015, the method may include receiving a first maximum permissible exposure value of the multiple values, the first maximum permissible exposure value associated with a first transmission aspect of the UE. The operations of 2015 may be performed in accordance with examples as disclosed herein. In some examples, aspects of the operations of 2015 may be performed by an MPE reception component 1330 as described with reference to FIG. 13.

At 2020, the method may include receiving a second maximum permissible exposure value of the multiple values, the second maximum permissible exposure value associated with a second transmission aspect of the UE and transmitted as a differential value based on the first maximum permissible exposure value. The operations of 2020 may be performed in accordance with examples as disclosed herein. In some examples, aspects of the operations of 2020 may be performed by a differential MPE reception component 1335 as described with reference to FIG. 13.

The following provides an overview of aspects of the present disclosure:

Aspect 1: A method for wireless communications at a UE, comprising: receiving control signaling that includes an indication that the UE is configured to report multiple values associated with maximum permissible exposure at the UE, each of the multiple values being of a same type but associated with different transmission aspects of the UE, the different transmission aspects including at least different transmission beams of the UE or different antenna panels of the UE; transmitting a first maximum permissible exposure value of the multiple values, the first maximum permissible exposure value associated with a first transmission aspect of the UE; and transmitting a second maximum permissible exposure value of the multiple values, the second maximum permissible exposure value associated with a second transmission aspect of the UE and transmitted as a differential value based at least in part on the first maximum permissible exposure value.

Aspect 2: The method of aspect 1, further comprising: transmitting the first maximum permissible exposure value, the second maximum permissible exposure value, and additional maximum permissible exposure values of the multiple values in a report, the additional maximum permissible exposure values each associated with a corresponding additional transmission aspect of the UE and each transmitted as an additional differential value based at least in part on an immediately preceding differential value within the report.

Aspect 3: The method of any of aspects 1 through 2, further comprising: transmitting the first maximum permissible exposure value, the second maximum permissible exposure value, and additional maximum permissible exposure values of the multiple values in a report, the additional maximum permissible exposure values each associated with a corresponding additional transmission aspect of the UE and each transmitted as an additional differential value based at least in part on the first maximum permissible exposure value.

Aspect 4: The method of aspect 3, further comprising: determining the additional differential values with respect to a non-quantized version or a quantized version of the first maximum permissible exposure value.

Aspect 5: The method of any of aspects 1 through 4, further comprising: determining, from the control signaling, a differential maximum permissible exposure reporting scheme that is to be used by the UE for transmitting the multiple values using respective differential values.

Aspect 6: The method of any of aspects 1 through 5, further comprising: determining, from the control signaling, that the multiple values are to be reported per transmission beam of a given antenna panel of the UE, per antenna panel for a given transmission beam of the UE, or a combination thereof.

Aspect 7: The method of any of aspects 1 through 6, wherein the first transmission aspect is a first antenna panel of the UE and the second transmission aspect is a second antenna panel of the UE.

Aspect 8: The method of any of aspects 1 through 7, wherein the first transmission aspect is a first transmission beam of the UE and the second transmission aspect is a second transmission beam of the UE.

Aspect 9: The method of any of aspects 1 through 8, wherein the second maximum permissible exposure value comprises fewer bits than the first maximum permissible exposure value.

Aspect 10: The method of any of aspects 1 through 9, further comprising: transmitting the first maximum permissible exposure value and the second maximum permissible exposure value as respective power headroom report values.

Aspect 11: The method of aspect 10, wherein the respective power headroom report values are each associated with an activated uplink transmission configuration indicator (TCI) state or a joint TCI state.

Aspect 12: The method of any of aspects 10 through 11, wherein the respective power headroom report values are each associated with at least one of a reported synchronization signal/physical broadcast channel block resource indicator (SSBRI), a channel state information reference signal resource indicator (CRI), or a panel indication.

Aspect 13: The method of any of aspects 1 through 12, further comprising: transmitting the first maximum permissible exposure value and the second maximum permissible exposure value as respective reference signal received power report values or respective signal to interference and noise ratio report values.

Aspect 14: The method of aspect 13, wherein each of the respective reference signal received power report values or respective signal to interference and noise ratio report values is associated with at least one of a reported synchronization signal/physical broadcast channel block resource indicator (SSBRI), a channel state information reference signal resource indicator (CRI), or a panel indication.

Aspect 15: A method for wireless communications at a base station, comprising: transmitting control signaling that includes an indication that a UE is configured to report multiple values associated with maximum permissible exposure at the UE, each of the multiple values being of a same type but associated with different transmission aspects of the UE, the different transmission aspects including at least different transmission beams of the UE or different antenna panels of the UE; receiving a first maximum permissible exposure value of the multiple values, the first maximum permissible exposure value associated with a first transmission aspect of the UE; and receiving a second maximum permissible exposure value of the multiple values, the second maximum permissible exposure value associated with a second transmission aspect of the UE and transmitted as a differential value based at least in part on the first maximum permissible exposure value.

Aspect 16: The method of aspect 15, further comprising: receiving the first maximum permissible exposure value, the second maximum permissible exposure value, and additional maximum permissible exposure values of the multiple values in a report, the additional maximum permissible exposure values each associated with a corresponding additional transmission aspect of the UE and each received as an additional differential value based at least in part on an immediately preceding differential value within the report.

Aspect 17: The method of any of aspects 15 through 16, further comprising: receiving the first maximum permissible exposure value, the second maximum permissible exposure value, and additional maximum permissible exposure values of the multiple values in a report, the additional maximum permissible exposure values each associated with a corresponding additional transmission aspect of the UE and each received as an additional differential value based at least in part on the first maximum permissible exposure value.

Aspect 18: The method of aspect 17, further comprising: determining the additional differential values with respect to a non-quantized version or a quantized version of the first maximum permissible exposure value.

Aspect 19: The method of any of aspects 15 through 18, further comprising: determining a differential maximum permissible exposure reporting scheme that is to be used by the UE for transmitting the multiple values using respective differential values.

Aspect 20: The method of any of aspects 15 through 19, further comprising: determining that the multiple values are to be reported per transmission beam of a given antenna panel of the UE, per antenna panel for a given transmission beam of the UE, or a combination thereof.

Aspect 21: The method of any of aspects 15 through 20, wherein the first transmission aspect is a first antenna panel of the UE and the second transmission aspect is a second antenna panel of the UE.

Aspect 22: The method of any of aspects 15 through 21, wherein the first transmission aspect is a first transmission beam of the UE and the second transmission aspect is a second transmission beam of the UE.

Aspect 23: The method of any of aspects 15 through 22, wherein the second maximum permissible exposure value comprises fewer bits than the first maximum permissible exposure value.

Aspect 24: The method of any of aspects 15 through 23, further comprising: receiving the first maximum permissible exposure value and the second maximum permissible exposure value as respective power headroom report values.

Aspect 25: The method of aspect 24, wherein the respective power headroom report values are each associated with an activated uplink transmission configuration indicator (TCI) state or a joint TCI state.

Aspect 26: The method of any of aspects 24 through 25, wherein the respective power headroom report values are each associated with at least one of a reported synchronization signal/physical broadcast channel block resource indicator (SSBRI), a channel state information reference signal resource indicator (CRI), or a panel indication.

Aspect 27: The method of any of aspects 15 through 26, further comprising: receiving the first maximum permissible exposure value and the second maximum permissible exposure value as respective reference signal received power report values or respective signal to interference and noise ratio report values.

Aspect 28: The method of aspect 27, wherein each of the respective reference signal received power report values or respective signal to interference and noise ratio report values is associated with at least one of a reported synchronization signal/physical broadcast channel block resource indicator (SSBRI), a channel state information reference signal resource indicator (CRI), or a panel indication.

Aspect 29: An apparatus for wireless communications at a UE, comprising a processor; memory coupled with the processor; and instructions stored in the memory and executable by the processor to cause the apparatus to perform a method of any of aspects 1 through 14.

Aspect 30: An apparatus for wireless communications at a UE, comprising at least one means for performing a method of any of aspects 1 through 14.

Aspect 31: A non-transitory computer-readable medium storing code for wireless communications at a UE, the code comprising instructions executable by a processor to perform a method of any of aspects 1 through 14.

Aspect 32: An apparatus for wireless communications at a base station, comprising a processor; memory coupled with the processor; and instructions stored in the memory and executable by the processor to cause the apparatus to perform a method of any of aspects 15 through 28.

Aspect 33: An apparatus for wireless communications at a base station, comprising at least one means for performing a method of any of aspects 15 through 28.

Aspect 34: A non-transitory computer-readable medium storing code for wireless communications at a base station, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving control signaling that includes an indication that the UE is configured to report multiple values associated with maximum permissible exposure at the UE, each of the multiple values being of a same type but associated with different transmission aspects of the UE, the different transmission aspects including at least different antenna panels of the UE;

transmitting a first maximum permissible exposure value of the multiple values, the first maximum permissible exposure value associated with a first transmission aspect of the UE; and transmitting a second maximum permissible exposure value of the multiple values, the second maximum permissible exposure value associated with a second transmission aspect of the UE and transmitted as a differential value based at least in part on the first maximum permissible exposure value.

2. The method of claim 1, further comprising:
transmitting the first maximum permissible exposure value, the second maximum permissible exposure value, and additional maximum permissible exposure values of the multiple values in a report, the additional maximum permissible exposure values each associated with a corresponding additional transmission aspect of the UE and each transmitted as an additional differential value based at least in part on an immediately preceding differential value within the report.

3. The method of claim 1, further comprising:
transmitting the first maximum permissible exposure value, the second maximum permissible exposure value, and additional maximum permissible exposure values of the multiple values in a report, the additional maximum permissible exposure values each associated with a corresponding additional transmission aspect of the UE and each transmitted as an additional differential value based at least in part on the first maximum permissible exposure value.

4. The method of claim 3, further comprising:
determining the additional differential values with respect to a non-quantized version or a quantized version of the first maximum permissible exposure value.

5. The method of claim 1, further comprising:
determining, from the control signaling, a differential maximum permissible exposure reporting scheme that is to be used by the UE for transmitting the multiple values using respective differential values.

6. The method of claim 1, further comprising:
determining, from the control signaling, that the multiple values are to be reported per transmission beam of a given antenna panel of the UE, per antenna panel for a given transmission beam of the UE, or a combination thereof.

7. The method of claim 1, wherein the first transmission aspect is a first antenna panel of the UE and the second transmission aspect is a second antenna panel of the UE.

8. The method of claim 1, wherein the first transmission aspect is a first transmission beam of the UE and the second transmission aspect is a second transmission beam of the UE.

9. The method of claim 1, wherein the second maximum permissible exposure value comprises fewer bits than the first maximum permissible exposure value.

10. The method of claim 1, further comprising:
transmitting the first maximum permissible exposure value and the second maximum permissible exposure value as respective power headroom report values.

11. The method of claim 10, wherein the respective power headroom report values are each associated with an activated uplink transmission configuration indicator (TCI) state or a joint TCI state.

12. The method of claim 10, wherein the respective power headroom report values are each associated with at least one of a reported synchronization signal/physical broadcast channel block resource indicator (SSBRI), a channel state information reference signal resource indicator (CRI), or a panel indication.

13. The method of claim 1, further comprising:
transmitting the first maximum permissible exposure value and the second maximum permissible exposure value as respective reference signal received power report values or respective signal to interference and noise ratio report values.

14. The method of claim 13, wherein each of the respective reference signal received power report values or respective signal to interference and noise ratio report values is associated with at least one of a reported synchronization signal/physical broadcast channel block resource indicator (SSBRI), a channel state information reference signal resource indicator (CRI), or a panel indication.

15. A method for wireless communications at a base station, comprising:
transmitting control signaling that includes an indication that a user equipment (UE) is configured to report multiple values associated with maximum permissible exposure at the UE, each of the multiple values being of a same type but associated with different transmission aspects of the UE, the different transmission aspects including at least different antenna panels of the UE;
receiving a first maximum permissible exposure value of the multiple values, the first maximum permissible exposure value associated with a first transmission aspect of the UE; and
receiving a second maximum permissible exposure value of the multiple values, the second maximum permissible exposure value associated with a second transmission aspect of the UE and transmitted as a differential value based at least in part on the first maximum permissible exposure value.

16. The method of claim 15, further comprising:
receiving the first maximum permissible exposure value, the second maximum permissible exposure value, and additional maximum permissible exposure values of the multiple values in a report, the additional maximum permissible exposure values each associated with a corresponding additional transmission aspect of the UE and each received as an additional differential value based at least in part on an immediately preceding differential value within the report.

17. The method of claim 15, further comprising:
receiving the first maximum permissible exposure value, the second maximum permissible exposure value, and additional maximum permissible exposure values of the multiple values in a report, the additional maximum permissible exposure values each associated with a corresponding additional transmission aspect of the UE and each received as an additional differential value based at least in part on the first maximum permissible exposure value.

18. The method of claim 17, further comprising:
determining the additional differential values with respect to a non-quantized version or a quantized version of the first maximum permissible exposure value.

19. The method of claim 15, further comprising:
determining a differential maximum permissible exposure reporting scheme that is to be used by the UE for transmitting the multiple values using respective differential values.

20. The method of claim 15, further comprising:
determining that the multiple values are to be reported per transmission beam of a given antenna panel of the UE, per antenna panel for a given transmission beam of the UE, or a combination thereof.

21. The method of claim 15, wherein the first transmission aspect is a first antenna panel of the UE and the second transmission aspect is a second antenna panel of the UE.

22. The method of claim 15, wherein the first transmission aspect is a first transmission beam of the UE and the second transmission aspect is a second transmission beam of the UE.

23. The method of claim 15, wherein the second maximum permissible exposure value comprises fewer bits than the first maximum permissible exposure value.

24. The method of claim 15, further comprising:

receiving the first maximum permissible exposure value and the second maximum permissible exposure value as respective power headroom report values.

25. The method of claim 24, wherein the respective power headroom report values are each associated with an activated uplink transmission configuration indicator (TCI) state or a joint TCI state.

26. The method of claim 24, wherein the respective power headroom report values are each associated with at least one of a reported synchronization signal/physical broadcast channel block resource indicator (SSBRI), a channel state information reference signal resource indicator (CRI), or a panel indication.

27. The method of claim 15, further comprising:

receiving the first maximum permissible exposure value and the second maximum permissible exposure value as respective reference signal received power report values or respective signal to interference and noise ratio report values.

28. The method of claim 27, wherein each of the respective reference signal received power report values or respective signal to interference and noise ratio report values is associated with at least one of a reported synchronization signal/physical broadcast channel block resource indicator (SSBRI), a channel state information reference signal resource indicator (CRI), or a panel indication.

29. A user equipment (UE) for wireless communications, comprising:

at least one processor;

at least one memory coupled with the at least one processor; and instructions stored in the at least one memory and executable by the at least one processor to cause the UE to:

receive control signaling that includes an indication that the UE is configured to report multiple values associated with maximum permissible exposure at the UE, each of the multiple values being of a same type but associated with different transmission aspects of the UE, the different transmission aspects including at least different antenna panels of the UE;

transmit a first maximum permissible exposure value of the multiple values, the first maximum permissible exposure value associated with a first transmission aspect of the UE; and transmit a second maximum permissible exposure value of the multiple values, the second maximum permissible exposure value associated with a second transmission aspect of the UE and transmitted as a differential value based at least in part on the first maximum permissible exposure value.

30. A network entity for wireless communications, comprising:

at least one processor;

at least one memory coupled with the at least one processor; and instructions stored in the at least one memory and executable by the at least one processor to cause the network entity to:

transmit control signaling that includes an indication that a user equipment (UE) is configured to report multiple values associated with maximum permissible exposure at the UE, each of the multiple values being of a same type but associated with different transmission aspects of the UE, the different transmission aspects including at least different antenna panels of the UE;

receive a first maximum permissible exposure value of the multiple values, the first maximum permissible exposure value associated with a first transmission aspect of the UE; and receive a second maximum permissible exposure value of the multiple values, the second maximum permissible exposure value associated with a second transmission aspect of the UE and transmitted as a differential value based at least in part on the first maximum permissible exposure value.

* * * * *